US006697567B1

(12) United States Patent
Suzuki

(10) Patent No.: US 6,697,567 B1
(45) Date of Patent: Feb. 24, 2004

(54) DYNAMIC IMAGE ENCODING APPARATUS

(75) Inventor: Mitsuyoshi Suzuki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/413,510

(22) Filed: Oct. 6, 1999

(30) Foreign Application Priority Data

May 24, 1999 (JP) .......................................... 11-143509

(51) Int. Cl.[7] .............................................. H04N 5/917
(52) U.S. Cl. .................... 386/111; 386/112; 375/240.03
(58) Field of Search ............................... 386/1, 33, 46, 386/45, 109, 111–112; 375/240.03, 240.04–240.07; 711/147–148

(56) References Cited

U.S. PATENT DOCUMENTS

| 5,594,598 | A | * | 1/1997 | Shikakura .................... 386/109 |
| 5,790,745 | A | * | 8/1998 | Sugiyama et al. ............ 386/111 |
| 5,950,164 | A | * | 9/1999 | Takahashi ..................... 704/270 |
| 6,341,338 | B1 | * | 1/2002 | Dennie ......................... 711/147 |
| 6,363,114 | B1 | * | 3/2002 | Kato ............................ 386/111 |
| 6,389,224 | B2 | * | 5/2002 | Mori et al. ................... 386/111 |

FOREIGN PATENT DOCUMENTS

| JP | 6-141298 | 5/1994 |
| JP | 8-17137 | 1/1996 |
| JP | 8-116511 | 5/1996 |
| JP | 8-340536 | 12/1996 |
| JP | 9-312831 | 12/1997 |
| JP | 10-172269 | 6/1998 |
| JP | 10-174058 | 6/1998 |
| JP | 10-302396 | 11/1998 |

* cited by examiner

Primary Examiner—Thai Tran
Assistant Examiner—Christopher Onuaku
(74) Attorney, Agent, or Firm—McDermott, Will & Emery

(57) ABSTRACT

When real-time recording a dynamic image in a storage medium of a fixed recording capacity at a variable bit rate, an encoding generated information quantity controller obtains a recording capacity and a recording time of information to be sequentially recorded in the storage medium, obtains a remaining recording capacity and a remaining recording time of the storage medium from the obtained recording capacity and recording time, calculates a target bit rate at and after the current time from the remaining recording capacity and the remaining recording time, and controls the variable bit rate to sequentially change its quantization step size to a quantization step size for maintaining a bit rate not larger than the target bit rate. Therefore, a dynamic image data with a proper picture quality can be stored within a prescribed time and prescribed capacity of the storage medium.

17 Claims, 25 Drawing Sheets

DYNAMIC IMAGE ENCODING APPARATUS

FIELD OF THE INVENTION

The present invention relates to a dynamic image encoding apparatus for real-time recording a dynamic image in a storage medium of a fixed recording capacity at a variable bit rate. The invention more particularly relates to a dynamic image encoding apparatus capable of recording data of a dynamic image of a prescribed time within a prescribed capacity of the storage medium while maintaining a picture quality level.

BACKGROUND OF THE INVENTION

Along with the popularization of the multi-media technology in recent years, dynamic image encoding apparatuses for carrying out variable bandwidth compression encoding such as MPEG (moving picture experts group) encoding system or the like have been frequently used. Regarding this encoding system, MPEG1 is prescribed in ISO13818 and MPEG2 is prescribed in ISO11172, for example.

FIG. 22 is a block diagram showing a structure of a conventional dynamic image encoding apparatus. Referring to FIG. 22, at first, an input original image 1 according to the NTSC system or the like to be coded and recorded is input to an input control section 2. Then, the input control section 2 time-filters and space-filters the input image to divide it into various kinds of pictures in the MPEG system including I picture (an intra-frame predicted image), P picture (a forward inter-frame predicted image) and B picture (a bi-directional inter-frame predicted image), rearranges the sequence of encoding and outputs input image data 3 divided into macro block units.

A movement detector 6 detects a movement of the P picture and the B picture based on the input image data 3 and inter-frame predicted image data 5 output from an image frame memory 4. Regarding the P picture and the B picture, an inter-frame subtractor 7 subtracts movement-compensated inter-frame predicted image data 5 from the input image data 3, and outputs a result to a DCT (a discrete cosine transformer) 9 as inter-frame differential data 8. Regarding the I picture, the inter-frame subtractor 7 sets the inter-frame predicted image data 5 to zero and outputs the input image data 3 to the DCT 9 as inter-frame differential data 8.

The DCT 9 discrete cosine transforms the inter-frame differential data and outputs a DCT output 10 to a quantizer 11. The quantizer 11 quantizes the DCT output 10 and produces a quantizer output 12. A variable length encoder 13 variable-length encodes the quantizer output 12, and outputs resultant bandwidth-compressed data as a transmission buffer input 14. On the other hand, in order to carry out a local decoding for generating inter-frame predicted images of subsequent image frames as an inter-frame predictive encoding according to differential pulse code modulation (DPCM) system, an inverse quantizer 15 inversely quantizes the quantizer output 12 and outputs a resultant inverse quantizer output 16 to an inverse discrete cosine transformer (an inverse DCT) 17. The inverse DCT 17 inversely discrete-cosine transforms the inverse quantizer output 16 and outputs a resultant inverse DCT output 18 to an inter-frame adder 19. The inter-frame adder 19 adds the inverse DCT output 18 and the inter-frame predicted image data 5, and stores a result in the image frame memory 4 as inter-frame added data 20. The inter-frame predicted image data of the I picture is zero.

A transmission buffer section 21 temporarily stores the transmission buffer input 14, and transmits it to a channel adapter or a storage medium 26 of a prescribed bit rate as a transmission buffer output 22 at a fixed bit rate in synchronism with a clock of a fixed bit rate clock 27. In this case, an encoding generated information quantity controller 109 controls a quantization step size 25 by using a transmission buffer status 23 from the transmission buffer section 21.

FIG. 24 shows a relationship between a bit rate and the quantization step size 25 of each input image data 3 by characteristics. Referring to FIG. 24, when the quantization step size 25 is made larger in an images having the same characteristics, the quantization becomes coarse and the picture quality of the coded image deteriorates. However, a small value is generated in a quantized result, and information quantity generated by a variable-length encoding decreases, resulting into a reduction in the bit rate. On the contrary, when the quantization step size 25 is made smaller, the quantization becomes fine and the picture quality of the coded image improves. However, a large value is generated in a quantized result and information quantity generated by the variable-length encoding increases, resulting into an increase in a bit rate. The input image data 3 has a range of characteristics from a large image having a largest generated information quantity with a fine image and a rapid movement as shown by the line 3a in FIG. 24, to an image having a smallest generated information quantity with a simple image and little movement as shown by the line 3c in FIG. 24. Usually, there exists, as a major portion, image input data of a standard generated information quantity as shown by the line 3b in FIG. 24.

FIG. 23 is a block diagram showing a detailed structure of the transmission buffer section 21 and the encoding generated information quantity controller 109. Referring to FIG. 23, a generated information quantity counter 101 counts at all times the transmission buffer input 14 and outputs a generated information quantity (a number of bits) 102. A transmission information quantity counter 103 counts at all times the transmission buffer output 22 and outputs a transmission information quantity (a number of bits) 104. A subtractor 105 subtracts the transmission information quantity 104 from the generated information quantity 102 and outputs a buffer stored information quantity 106.

The generated information quantity 102, the transmission information quantity 104 and the buffer stored information quantity 106 are input into the encoding generated information quantity controller 109 as a transmission buffer status 23. The encoding generated information quantity controller 109 samples the input transmission buffer status 23 with registers 107, and determines a quantization step size with CPU 108 based on this transmission buffer status 23, and outputs a result as the quantization step size 25 to the quantizer 11 and the inverse quantizer 15.

When the buffer capacity of the transmission buffer 21a is B, for example, encoding is carried out in a quantization step size Q0 and information is stored until the buffer capacity reaches B/2. When the buffer capacity has reached B/2, transmission is started from this time at a fixed transmission bit rate R0. Thereafter, a differential obtained by subtracting the fixed transmission bit rate R0 from the generated bit rate R of the transmission buffer input 14 is time-integrated, and the differential is increased or decreased as a buffer stored quantity.

The CPU 108 calculates the following expression by assuming that an average during one second of the buffer stored information quantities 106 for each frame to be A:

$$Q(n+1)=Q(n)+(2A/B-1)\cdot Q0 \qquad (1)$$

Then, the CPU 108 controls to make the stored information quantity of the transmission buffer section 21 come closer to B/2. In the above expression, Q (n+1) represents a quantization step size of a frame (n+1), Q (n) represents a quantization step size of a frame n, and Q0 represents a constant. The CPU 108 carries out various controls such as the control of changing the ratio of the quantization step size 25 for each of the I picture, P picture and B picture.

FIG. 25 shows a relationship between a generated information quantity and a recording time according to the conventional dynamic image encoding apparatus. In FIG. 25, although the amount of changes are different depending on the time constant taken for averaging the buffer stored information quantity 106 for each frame, the bit rate deviates from a target bit rate to a large extent when the time constant is too large. Therefore, it is necessary to take a time constant within a range of a few seconds to a few tens of seconds.

However, according to the above-described conventional dynamic image encoding apparatus, when a transmission bit rate has been prescribed in advance, a signal is transmitted from the transmission buffer section 21 to match the prescribed transmission bit rate. Accordingly, the range of picture quality control is limited, and it is not possible to flexibly adapt to a storage medium such as a disk or the like that can record information at a desired variable bit rate. Thus, there has been a problem that it is not possible to store dynamic image of a prescribed time within a prescribed capacity of the storage medium.

Further, there has been a problem that in the case of carrying out a recording management of a storage medium for recording at a variable bit rate, it is difficult to clearly grasp the remaining recording time and the like because of the variable bit rate.

SUMMARY OF THE INVENTION

It is an object of the present invention to provide a dynamic image encoding apparatus which can accommodate dynamic image data in a proper picture quality within a prescribed time of a storage medium for recording at a variable bit rate and which facilitates recording management of the storage medium.

In one aspect of the invention, an obtaining unit obtains a recording capacity and a recording time of recorded information sequentially recorded on the storage medium, a calculating unit obtains a remaining recording capacity and a remaining recording time of the storage medium from the recording capacity and the recording time obtained by the obtaining unit, and calculates a target bit rate at and after the current time from the remaining recording capacity and the remaining recording time, and a control unit controls the variable bit rate to sequentially change its quantization step size to a quantization step size for maintaining a level not larger than the target bit rate.

In an another aspect of the invention, a division setting unit divides and sets a recording area of the storage medium into a plurality of divided recording areas, a obtaining unit obtains a recording capacity and a recording time of recorded information sequentially recorded in each of the divided recording areas, a calculating unit obtains a remaining recording capacity and a remaining recording time for each of the divided recording areas from the recording capacity and the recording time obtained by the obtaining unit, and calculates a target bit rate at and after the current time from the remaining recording capacity and the remaining recording time, and a control unit controls the variable bit rate to sequentially change its quantization step size to a quantization step size for maintaining a level not larger than the target bit rate.

In an another aspect of the invention, the division setting unit divides the recording area into a plurality of equally divided recording areas, and the variable bit rate is controlled to sequentially change its quantization step size to a quantization step size for maintaining not larger than the target bit rate.

In an another aspect of the invention, a setting unit sets a target bit rate in a predetermined prescribed recording time of recorded information sequentially recorded in the storage medium, a obtaining unit obtains a recording capacity and a recording time of recorded information sequentially recorded on the storage medium, a calculating unit calculates an average bit rate of a current time from a recording capacity and a recording time obtained by the obtaining unit after starting the prescribed recording time, and a control unit controls the average bit rate to sequentially change its quantization step size to a quantization step size for maintaining a level not larger than the target bit rate for each of the prescribed recording time.

In an another aspect of the invention, the setting unit sets the target bit rate as a function of the target bit rate for the prescribed recording time, and the control unit controls the quantization step size so that a maximum generated information quantity between optional 1 recording positions becomes not larger than a maximum generated information quantity of the function.

In an another aspect of the invention, a first setting unit sets a lower limit bit rate for guaranteeing a picture quality of not lower than a first predetermined level, and the control unit forcibly controls at least the variable bit rate to sequentially change its quantization step size to a quantization step size for maintaining a level not smaller than the lower limit bit rate.

In an another aspect of the invention, a second setting unit sets an upper limit bit rate for making a picture quality to be maintained at a level not higher than a second predetermined level, and the control unit forcibly controls at least the variable bit rate to sequentially change its quantization step size to a quantization step size for maintaining a level not larger than the upper limit bit rate.

In an another aspect of the invention, a setting and inputting unit sets and inputs a desired picture quality, the control unit obtains a quantization step size corresponding to the desired picture quality set and input by the setting and inputting unit from a relationship table for storing a relationship between the desired picture quality and a quantization step size corresponding to the picture quality, and controls the encoding of the dynamic image by using the obtained quantization step size.

In an another aspect of the invention, an arithmetic unit calculates a recording capacity and a recording time for a case where information has been recorded on the storage medium based on a bit rate of a standard picture quality, and a display unit displays as output the recording capacity and the recording time calculated by the arithmetic unit.

In an another aspect of the invention, a converting unit obtains a recording capacity of the storage medium at the current time, and obtains a recording time corresponding to this recording capacity by conversion using a bit rate of the standard picture quality, and a time display unit displays as output the recording time obtained by conversion by the converting unit.

Other objects and features of this invention will become understood from the following description with reference to the accompanying drawings.

DESCRIPTION OF THE PREFERRED EMBODIMENTS

Preferred embodiments of the present invention will now be explained in detail with reference to the attached drawings.

Embodiment 1

Figure 1:
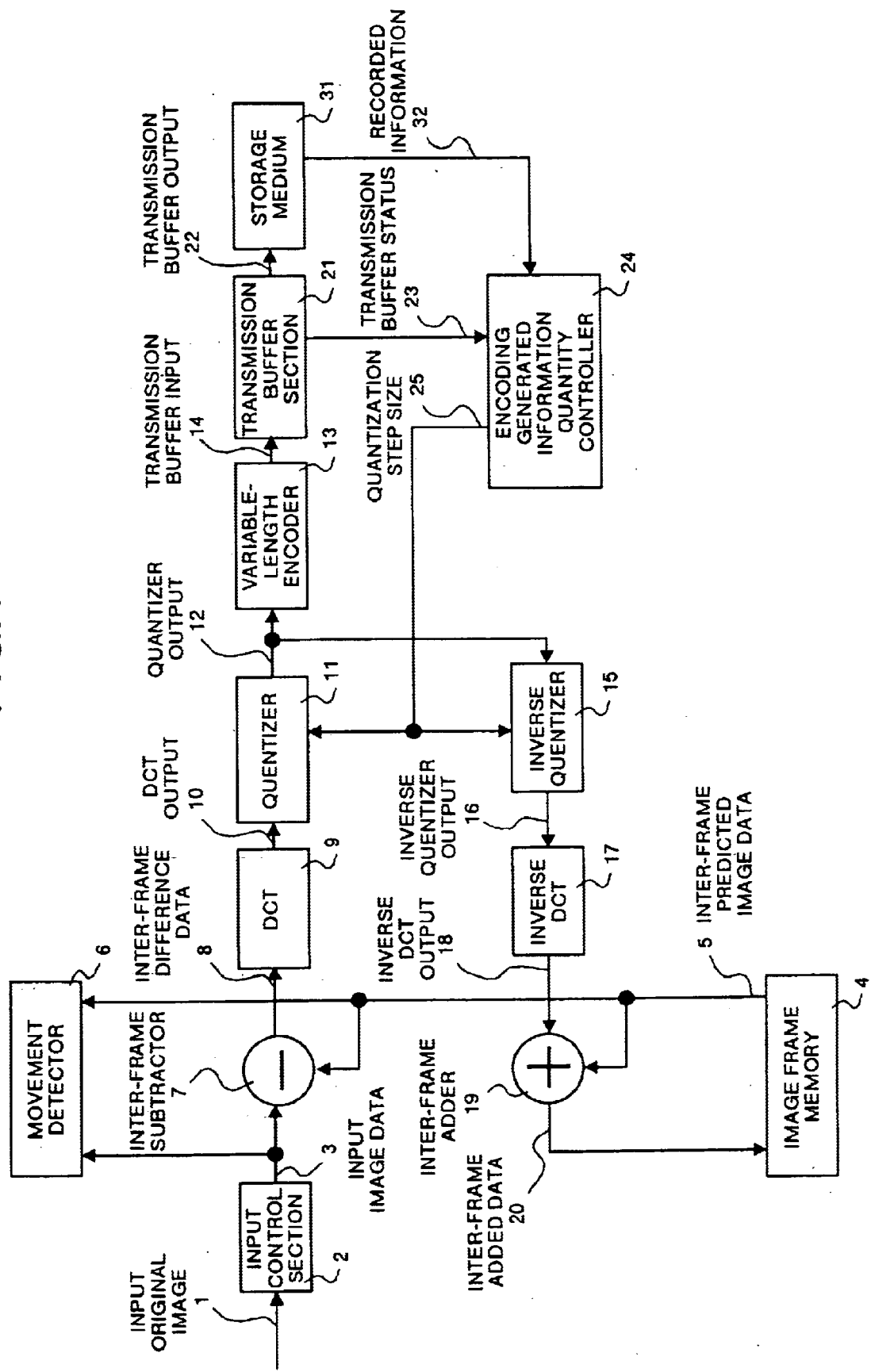
FIG. 1 is a block diagram showing an overall structure of a dynamic image encoding apparatus in a first embodiment of the present invention.

At first, a first embodiment of the present invention will be explained. FIG. 1 is a block diagram showing an overall structure of a dynamic image encoding apparatus as a first embodiment of the invention. Referring to FIG. 1, at first, an input original image 1 according to the NTSC system or the like to be coded and recorded is input to an input control section 2. Then, the input control section 2 time-filters and space-filters the input image to divide it into various kinds of pictures in the MPEG system including I picture (an intra-frame predicted image), P picture (a forward inter-frame predicted image) and B picture (a bi-directional inter-frame predicted image), rearranges the sequence of encoding and outputs input image data 3 divided into macro block units.

A movement detector 6 detects a movement of the P picture and the B picture based on the input image data 3 and inter-frame predicted image data 5 output from an image frame memory 4. Regarding the P picture and the B picture, an inter-frame subtractor 7 subtracts movement-compensated inter-frame predicted image data 5 from the input image data 3, and outputs a result to a DCT (a discrete cosine transformer) 9 as inter-frame differential data 8. Regarding the I picture, the inter-frame subtractor 7 sets the inter-frame predicted image data 5 to 0 and outputs the input image data 3 to the DCT 9 as inter-frame differential data 8.

The DCT 9 discrete cosine transforms the inter-frame differential data 8 and outputs a DCT output 10 to a quantizer 11. The quantizer 11 quantizes the DCT output 10 and produces a quantizer output 12. A variable length encoder 13 variable-length encodes the quantizer output 12, and outputs resultant bandwidth-compressed data as a transmission buffer input 14. On the other hand, in order to carry out a local decoding for generating inter-frame predicted images of subsequent image frames as an inter-frame predictive encoding according to differential pulse code modulation (DPCM) system, an inverse quantizer 15 inversely quantizes the quantizer output 12 and outputs an obtained inverse quantizer output 16 to an inverse discrete cosine transformer (an inverse DCT) 17. The inverse DCT 17 inversely discrete-cosine transforms the inverse quantizer output 16 and outputs an obtained inverse DCT output 18 to an inter-frame adder 19. The inter-frame adder 19 adds the inverse DCT output 18 and the inter-frame predicted image data 5, and stores a result in an image frame memory 4 as inter-frame added data 20. The inter-frame predicted image data of the I picture is zero.

A transmission buffer section 21 temporarily stores the transmission buffer input 14, and outputs it to a storage medium 31 as a transmission buffer output 22 of a variable bit rate. The storage medium 31 sequentially stores the transmission buffer output 22, and outputs recorded information 32 relating to this recording to an encoding generated information quantity controller 24. The encoding generated information quantity controller 24 controls a quantization step size 25 in the quantizer 11 and the inverse quantizer 15 respectively based on the transmission buffer 23 and recorded information 32.

Figure 2:
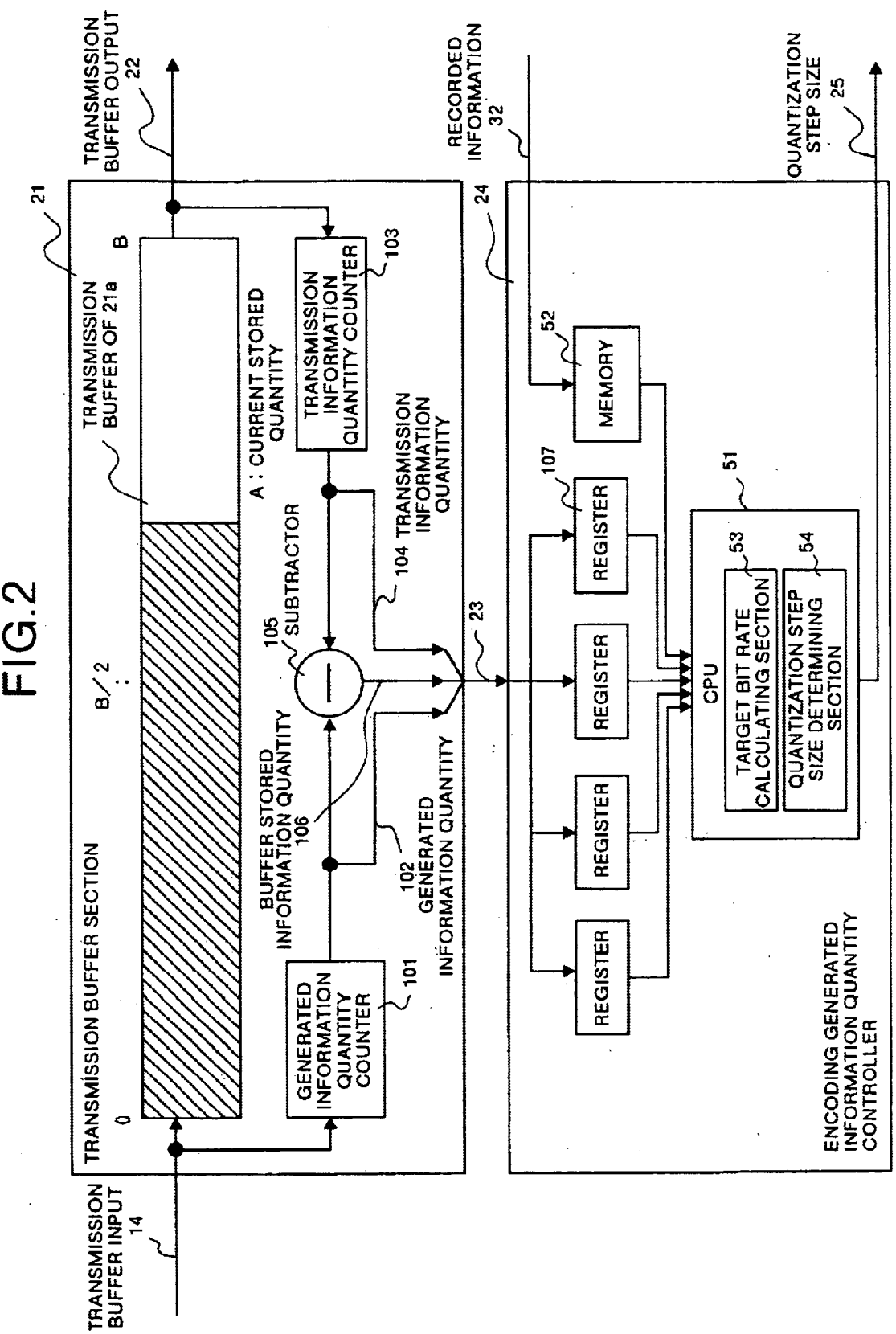
FIG. 2 is a block diagram showing a detailed structure of a transmission buffer section and an encoding generated information quantity controller shown in FIG. 1.

The control processing of the quantization step size 25 will be explained next with reference to a block diagram showing a detailed structure of the transmission buffer section 21 and the encoding generated information quantity controller 24 in FIG. 2. Referring to FIG. 2, a generated information quantity counter 101 counts at all times the transmission buffer input 14 and outputs a generated information quantity (a number of bits) 102. A transmission information quantity counter 103 counts at all times the transmission buffer output 22 and outputs a transmission information quantity (a number of bits) 104. A subtractor 105 subtracts the transmission information quantity 104 from the generated information quantity 102 and outputs a buffer stored information quantity 106.

The generated information quantity 102, the transmission information quantity 104 and the buffer stored information quantity 106 are input into the encoding generated information quantity controller 24 as a transmission buffer status 23. The encoding generated information quantity controller 24 has a memory 52. The memory 52 sequentially stores the recorded information 32 output from the storage medium 31, that is, a recording time and a recording information quantity. The encoding generated information quantity controller 24 samples the input transmission buffer status 23 with registers 107, and determines a quantization step size with CPU 51 based on this transmission buffer status 23 and the recorded information 32 stored in the memory 52, and outputs a result as the quantization step size 25 to the quantizer 11 and the inverse quantizer 15.

When the buffer capacity of the transmission buffer 21a is B, for example, encoding is carried out in a quantization step size Q0 and information is stored until the buffer capacity reaches B/2. When the buffer capacity has reached B/2, transmission is started from this time at a transmission bit rate R0. Thereafter, a differential obtained by subtracting the transmission bit rate R0 from the generated bit rate R of the transmission buffer input 14 is time-integrated, and the differential is increased or decreased as a buffer stored quantity. However, as the transmission buffer output 22 is a variable bit rate, the CPU 51 controls the quantization step size 25 based on the information of the recorded information 32 output from the storage medium 31 and stored in the memory 52 as described above.

The CPU 51 has a target bit rate calculating section 53. The target bit rate calculating section 53 calculates a remaining recording time and a remaining recording capacity from the recording time and the recording information quantity (the recording capacity) recorded in the memory 52, and then calculates a target bit rate which is a value obtained by dividing the remaining recording capacity by the remaining recording time.

Figure 3:
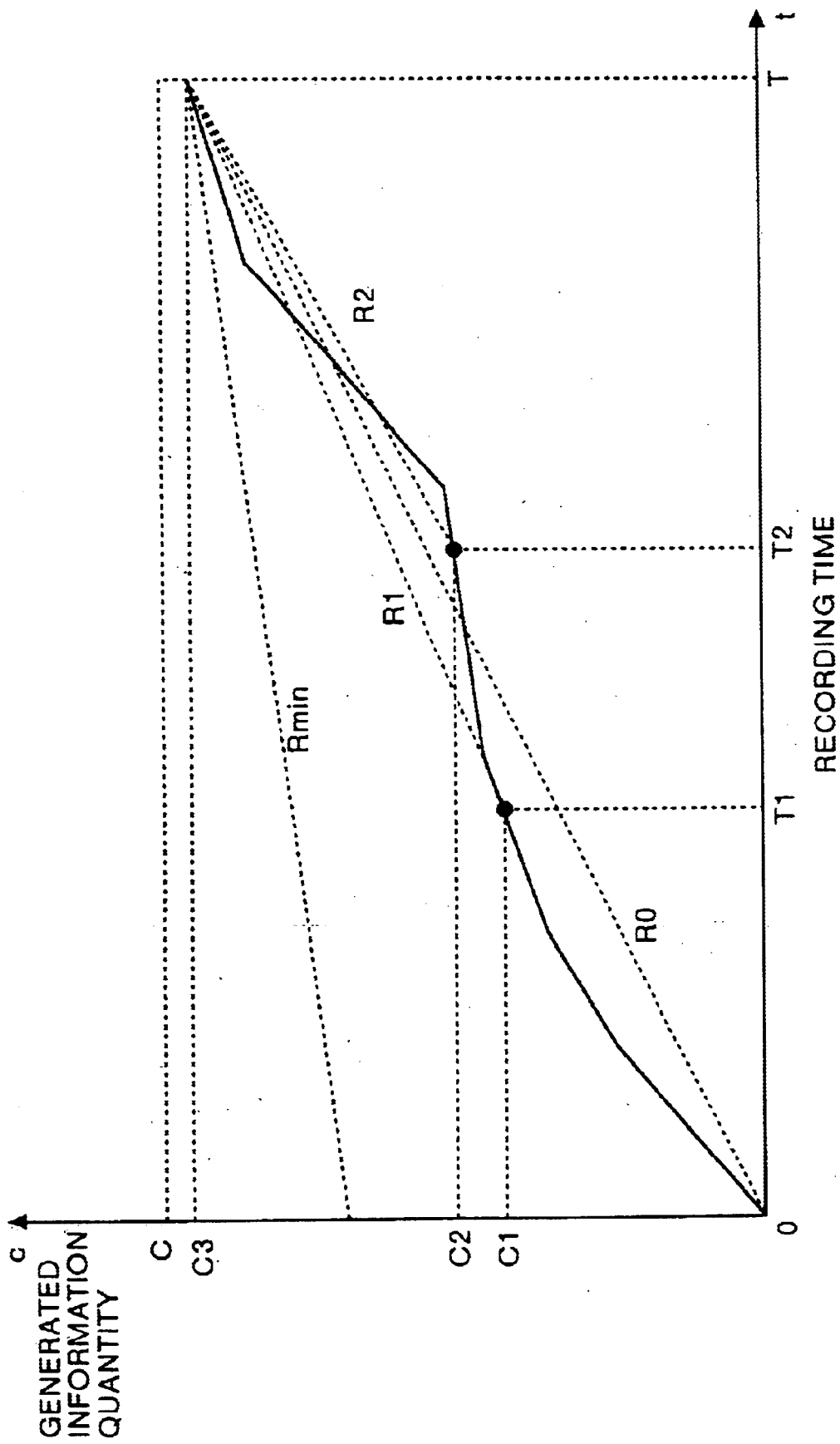
FIG. 3 shows a relationship between a recording time and a generated information quantity of a storage medium in the first embodiment of the invention.

The process of calculating the target bit rate will be explained with reference to FIG. 3. FIG. 3 shows a relationship between the recording time and the generated information quantity of the storage medium 31. A solid line expresses a relationship between a recording time and a generated information quantity of the information actually recorded. The generated information quantity is finally equal to the storage capacity of the information stored in the storage medium 31. In FIG. 3, at the starting of the recording, a target bit rate R0 (=C3/T) is calculated as a value obtained by dividing a recording capacity C3 which is a value obtained by subtracting a predetermined margin from a total recording capacity C of the storage medium 31, by a prescribed time T during which time the information is to be finally recorded in the storage medium 31.

Thereafter, the target bit rate from a current time is changed based on the recorded information 32 recorded in the memory 52. For example, when generated information quantity is C1 at a current time after the lapse of a recording time T1, a target bit rate R1 after the current time is calculated according to the following expression (2).

$$R1=(C3-C1)/(T-T1) \qquad (2)$$

In this expression (2), (C3−C1) represents a remaining recording capacity, and (T−T1) represents a remaining recording time. Similarly, at a next time which is the recording time T2, a remaining recording capacity is (C3−C2) and a remaining recording time is (T−T2). Accordingly, a target bit rate R2 at the recording time T2 is R2 (=(C3−C2)/(T−T2).

Based on the target bit rate calculated in this way, a quantization step size determining section 54 determines the quantization step size 25 (Q) according to the above-described expression (1), as follows.

$$Q(n+1)=Q(n)+(2A/B-1)\cdot Q0$$

By using the above expression (1), the quantization step size determining section 54 determines the quantization step size Q, and outputs this quantization step size to the quantizer 11 and the inverse quantizer 15 so that the variable bit rate is accommodated within the target bit rate. In this expression (1), A represents an averaged for a few seconds of the buffer stored information quantity 106 for each frame. By using this average value, the value of the quantization step size Q does not change suddenly but varies gradually, so that it is possible to allocate small quantity of information to an input image of small generated information quantity 102, thereby to control the picture quality to be uniform.

However, when an input image of large generated information quantity 102 is concentrated at the beginning, it is necessary to guarantee a bit rate Rmin which is a controllable limit at which the input image can be controlled regardless of the size of the generated information quantity at the latter stage. For this purpose, when the target bit rates R0 to R2 are less than the bit rate Rmin, the quantization step size is increased steeply, so as to control the target bit rate to be maintained higher than the bit rate Rmin. The above-described predetermined margin (=C−C3) is a margin provided for the case where the generated information quantity cannot be controlled when the quantization step size Q is increased steeply.

As described above, according to the first embodiment, by prescribing the recording time T for recording in the storage medium 31 and by updating the target bit rates R0 to R2 from time to time, it is possible to accommodate the dynamic image having the time T within the recording capacity of the storage medium 31.

According to the conventional dynamic image encoding apparatus, when a recording is stopped and started again at an optional recording position, a deviation from the bit rate of the stopped point of time is accumulated. However, according to the first embodiment of the present invention, it is possible to maintain the control even if recording is stopped in the middle of the recording.

Next, a second embodiment of the invention will be explained. In the first embodiment, the target bit rates R0 to R2 of the storage medium 31 are calculated occasionally from the remaining recording time and the remaining recording capacity, so as to update the quantization step size Q. However, in the second embodiment, the recording area of the storage medium 31 is divided into areas of a plurality of recording times or a plurality of recording capacities, and at the recording time in each of the divided areas, a target bit rate is calculated from a remaining recording time and a remaining recording capacity within the area, so as to update the quantization step size Q.

Figure 4:
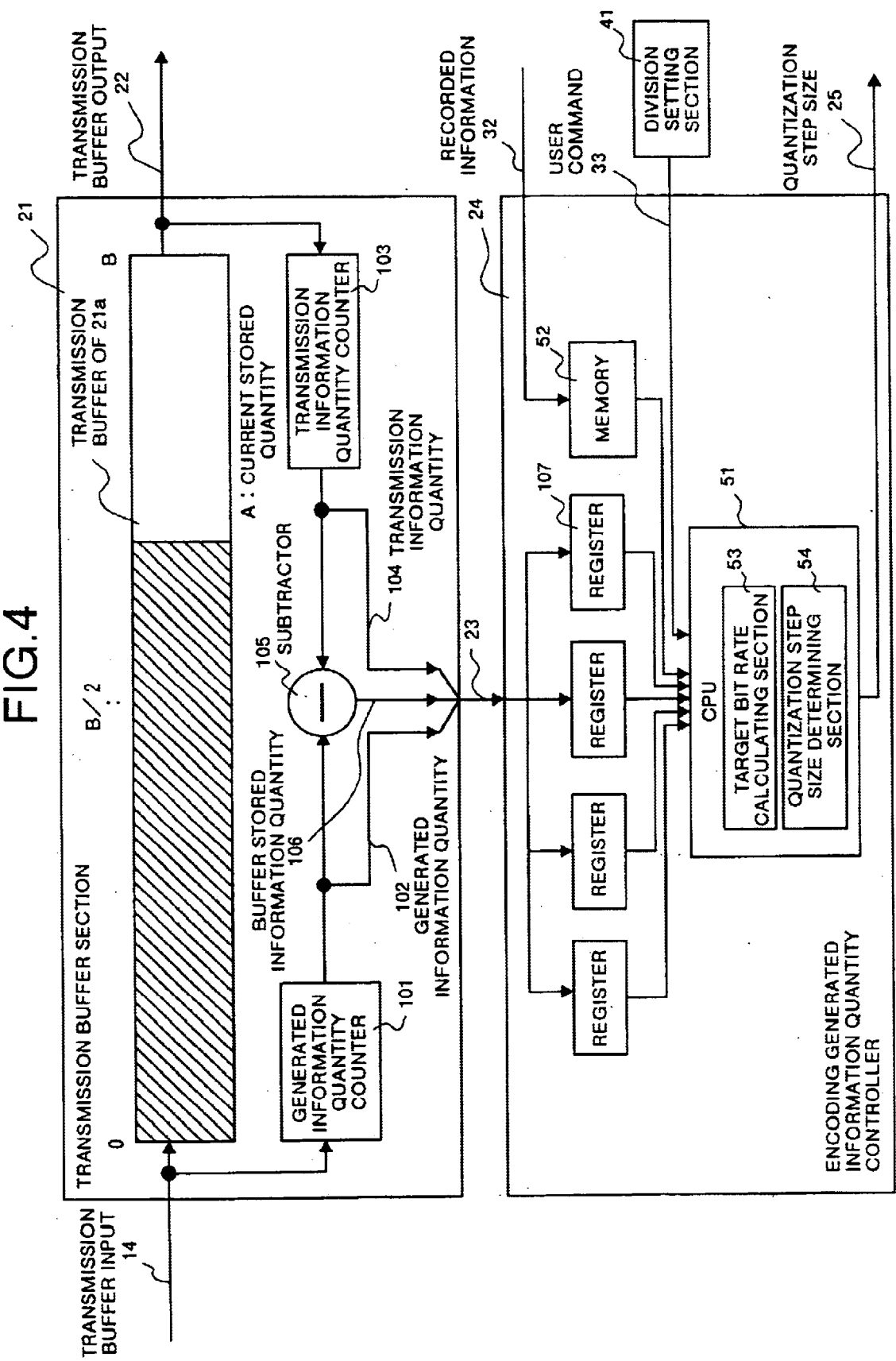
FIG. 4 is a block diagram showing a detailed structure of a transmission buffer section and an encoding generated information quantity controller within a dynamic image encoding apparatus in a second embodiment of the invention.

FIG. 4 is a diagram showing a detailed structure of the transmission buffer section 21 and the encoding generated information quantity controller 24 within the dynamic image encoding apparatus as the second embodiment of the invention. In FIG. 4, a division setting section 41 divides the recording area of the storage medium 31 into areas of a plurality of recording times or a plurality of recording capacities, and inputs the information regarding these setting (Namely, user command 33) to the CPU 51. The rest of the structure is the same as that of FIG. 1 and FIG. 2 respectively, and identical structure items are indicated by the identical reference numbers.

A target bit rate calculating section 53 within the CPU 51 carries out a similar processing to that of the first embodiment for each area set by the division setting section 41. In other words, the target bit rate calculating section 53 calculates a remaining recording time and a remaining recording capacity in the current divided area from the recording time and the recording information quantity (the recording capacity) stored in the memory 52, and calculates a target bit rate in the current divided area which is a value obtained by dividing the remaining recording capacity by the remaining recording time.

Figure 5:
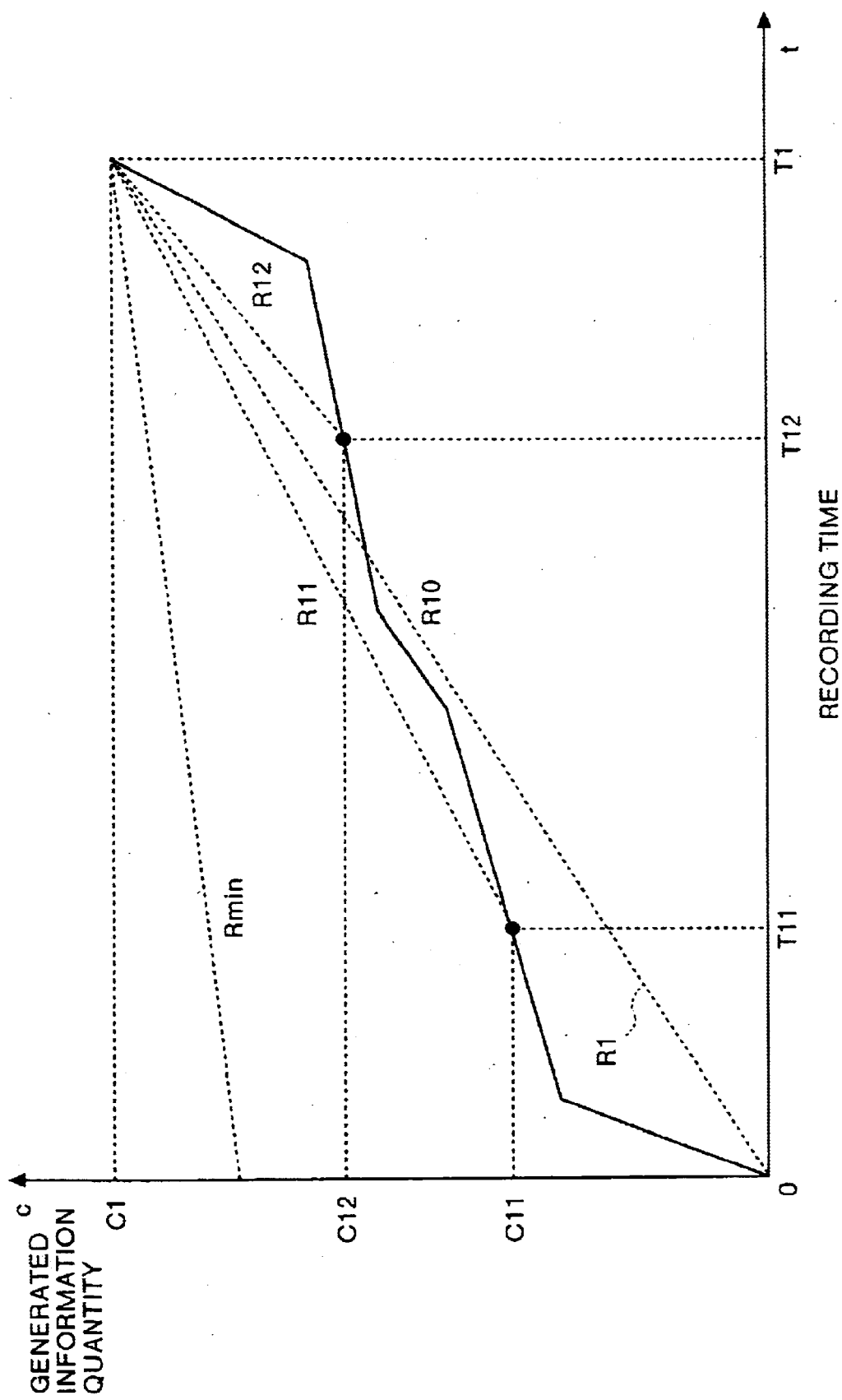
FIG. 5 shows a relationship between a recording time and a generated information quantity in the second embodiment of the invention.

The process of calculating the target bit rate will be explained with reference to FIG. 5. FIG. 5 shows a relationship between the recording time and the generated information quantity within one divided area of the storage medium 31. A solid line expresses a relationship between a recording time and a generated information quantity of the information actually recorded in the divided area. The generated information quantity is finally equal to the storage capacity of the information stored in the storage medium 31. In FIG. 5, at the starting of the recording in the divided area, a target bit rate R10 (=C1/T1) is calculated as a value obtained by dividing a divided recording capacity C1 by a prescribed time T1.

Thereafter, the target bit rate from a current time is changed based on the recorded information 32 recorded in the memory 52. For example, when the generated information quantity is C11 at a current time after the lapse of a recording time T11, a target bit rate R11 after the current time is calculated according to the following expression (3).

$$R1 = (C1-C11)/(T1-T11) \quad (3)$$

In this expression (3), (C1−C11) represents a remaining recording capacity in the divided area, and (T1−T11) represents a remaining recording time in the divided area. Similarly, when the recording time at a next time is T12, a remaining recording capacity is (C1−C12) and a remaining recording time is (T1−T12). Accordingly, a target bit rate R12 at the recording time T12 is R12 (=(C1−C12)/(T1−T12).

Based on the target bit rate calculated in this way, the quantization step size determining section 54 determines the quantization step size Q according to the above-described expression (1). The determined quantization step size Q is output to the quantizer 11 and the inverse quantizer 15 so that the variable bit rate is accommodated within the target bit rate.

Figure 6:
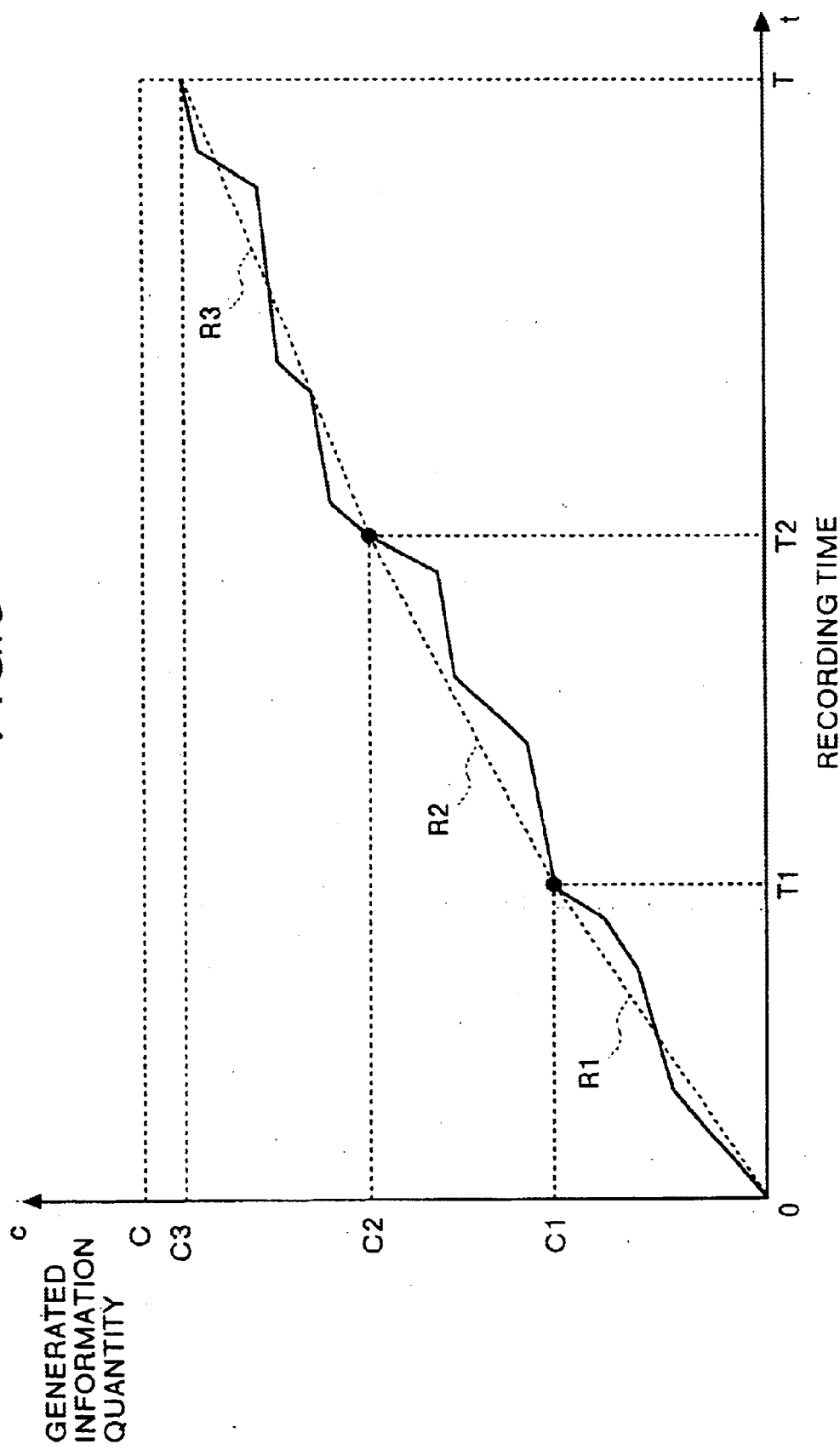
FIG. 6 shows a relationship between a recording time and a generated information quantity of a storage medium in the second embodiment of the invention.

By the divided area set in the manner as described above, recording areas of one storage medium are formed, and there is obtained a relationship between a recording time and a generated information quantity as shown in FIG. 6. Referring to FIG. 6, a target bit rate R1 corresponds to the target bit rate R10 shown in FIG. 5, and this is a target bit rate in the divided area of the divided recording time T1 or the divided recording capacity C1. Similarly, a target bit rate R2 is a target bit rate in the divided area of a divided recording time (T2−T1) or a divided recording capacity (C2−C1). A target bit rate R3 is a target bit rate in the divided area of a divided recording time (T1−T2) or a divided recording capacity (C3−C2). In this case, a recording capacity (C−C3) is a margin similar to that of the first embodiment.

According to this second embodiment, it is possible to record image sequences in each divided area. That is, in the case of the second embodiment, three image sequences can be recorded in the three divided areas, and all of the three image sequences can be accommodated within the total recording capacity. Further, by suitably setting the divided areas, it is possible to limit the recording capacity in the case of copying each image sequence recorded in each divided area to other storage medium.

Next, a third embodiment of the invention will be explained. In the second embodiment, the recording area of one storage medium 31 is divided into a plurality of areas based on optional recording times and recording capacities. However, in the third embodiment, the recording area is divided into a plurality of equally divided areas to avoid an extreme deviation of generated information quantity.

Figure 7:
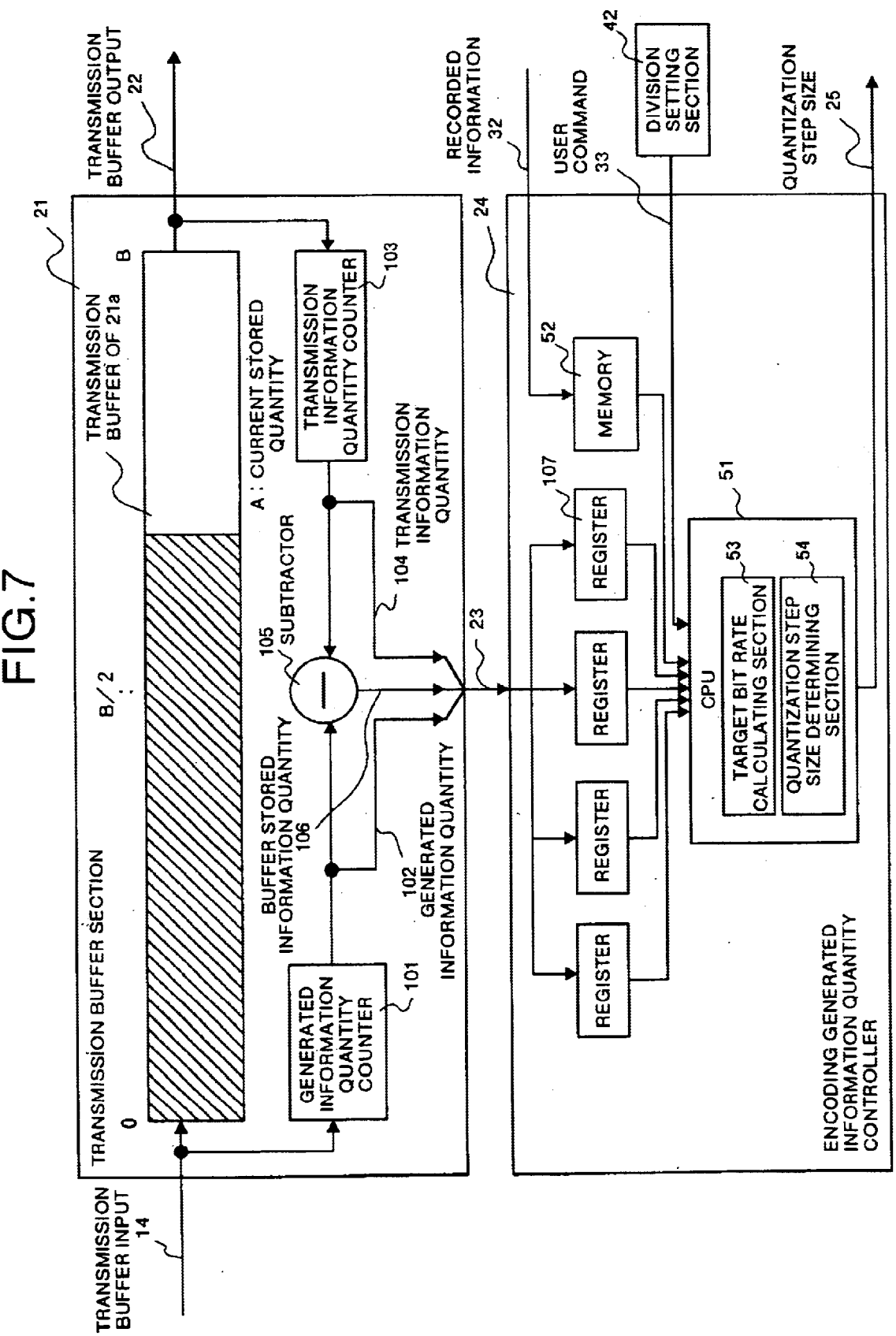
FIG. 7 is a block diagram showing a detailed structure of a transmission buffer section and an encoding generated information quantity controller within a dynamic image encoding apparatus in a third embodiment of the invention.

FIG. 7 is a diagram showing a detailed structure of the transmission buffer section 21 and the encoding generated information quantity controller 24 within the dynamic image encoding apparatus as the third embodiment of the invention. In FIG. 7, a division setting section 42 divides the recording area of the storage medium 31 into areas of a plurality of recording times or a plurality of recording capacities, and inputs the information regarding these setting to the CPU 51. The rest of the structure is the same as that of FIG. 1 and FIG. 2 respectively, and identical structure items are indicated by the identical reference numbers.

The target bit rate calculating section 53 within the CPU 51 carries out a similar processing to that of the second embodiment for each area set by the division setting section 42. In other words, the target bit rate calculating section 53 calculates a remaining recording time and a remaining recording capacity in the current divided area from the recording time and the recording information quantity (the recording capacity) stored in the memory 52, and calculates a target bit rate in the current divided area which is a value obtained by dividing the remaining recording capacity by the remaining recording time.

Figure 8:
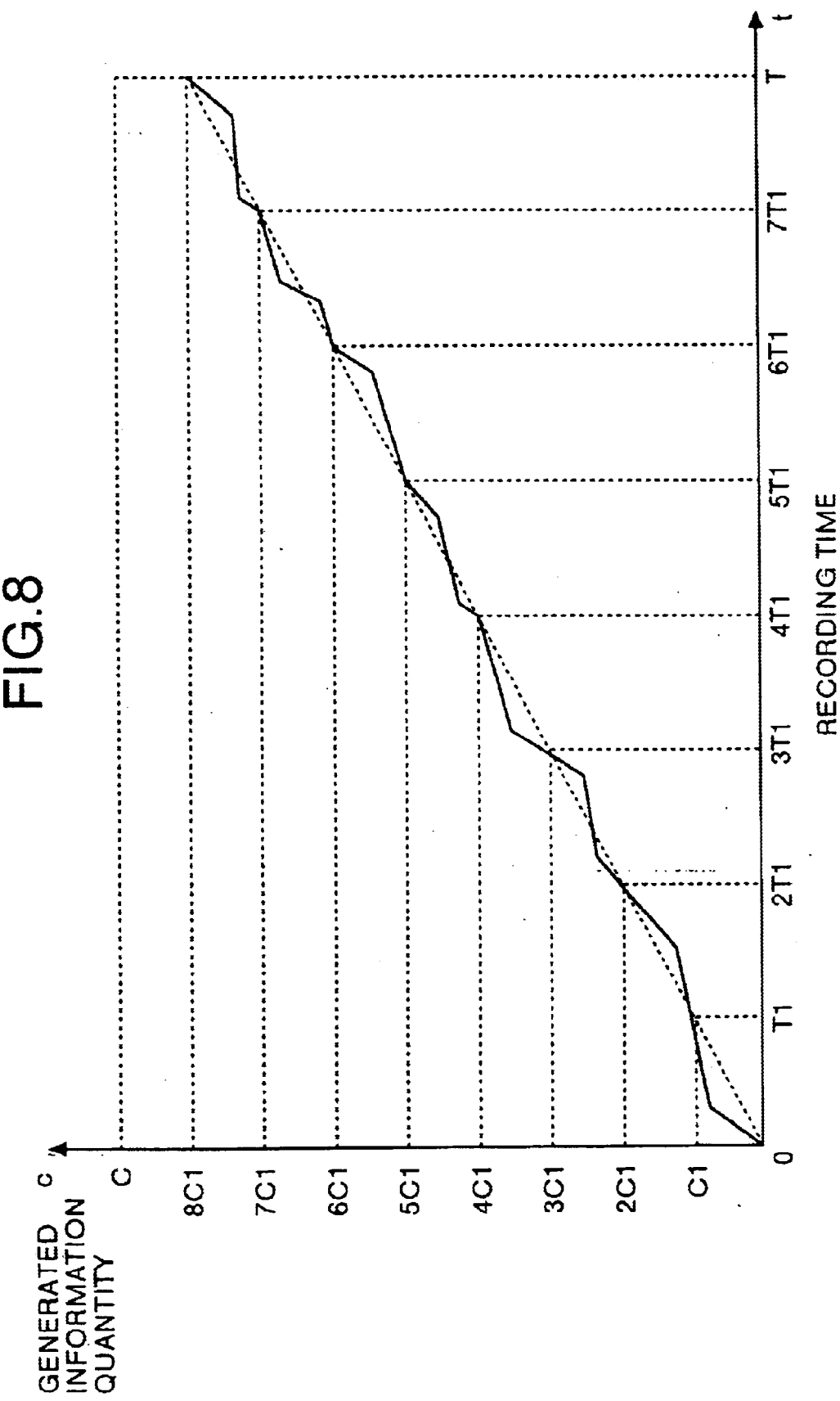
FIG. 8 shows a relationship between a recording time and a generated information quantity of a storage medium in the third embodiment of the invention.

The process of calculating the target bit rate will be explained with reference to FIG. 8. FIG. 8 shows a relationship between the recording time and the generated information quantity within one divided area of the storage medium 31. A solid line expresses a relationship between a recording time and a generated information quantity of the information actually recorded in the divided area. The generated information quantity is finally equal to the storage capacity of the information stored in the storage medium 31.

In FIG. 8, the total recording time T of one storage medium 31 is equally divided into eight recording areas by the division setting section 42. In each divided recording time having an equally-divided recording time T1, a divided recording capacity C1 is allocated. The divided recording time C1 is a value obtained by equally dividing the recording capacity after subtracting a predetermined margin from the total recording capacity C. As the divided recording time T1 held by each divided area is the same as the divided recording capacity C1, each target bit rate is calculated to be the same for all.

Accordingly, the target bit rate which is the same as that of the second embodiment is set. However, as the quantization step size is controlled in detail for each divided area, a generated information quantity or a recording information quantity is not deviated large from the target bit rate.

Therefore, when, for example, a total of the recording times of two image sequences stored in two storage mediums respectively is a recording time T of one storage medium, and when an image sequence is to be copied from the other storage medium to the one storage medium, it is possible to guarantee the accommodation of the image sequences with zero margin when the image sequences are separated at a division point. Further, when the image sequences are not separated at a division point, it is possible to guarantee the accommodation of the two image sequences within the recording time T by providing one margin to the first recorded image sequence and two front and back margins to the next image sequence, that is, by providing three division recording capacities C1 for margins.

According to the third embodiment, it is possible to control the recording to avoid an extreme deviation of the generated information quantity for each divided area as the recording area of one storage medium is divided into a plurality of equally divided areas. Therefore, the set processing at the time of copying is also facilitated.

Next, a fourth embodiment of the invention will be explained. In the second embodiment, the recording area of one storage medium 31 is divided into a plurality of areas based on optional recording times and recording capacities. However, in the fourth embodiment, an optional part recording time within one storage medium 31 and a target bit rate in this part recording time are set, and an average bit rate at the time of recording in this part recording time is controlled to be not larger than the target bit rate.

Figure 9:
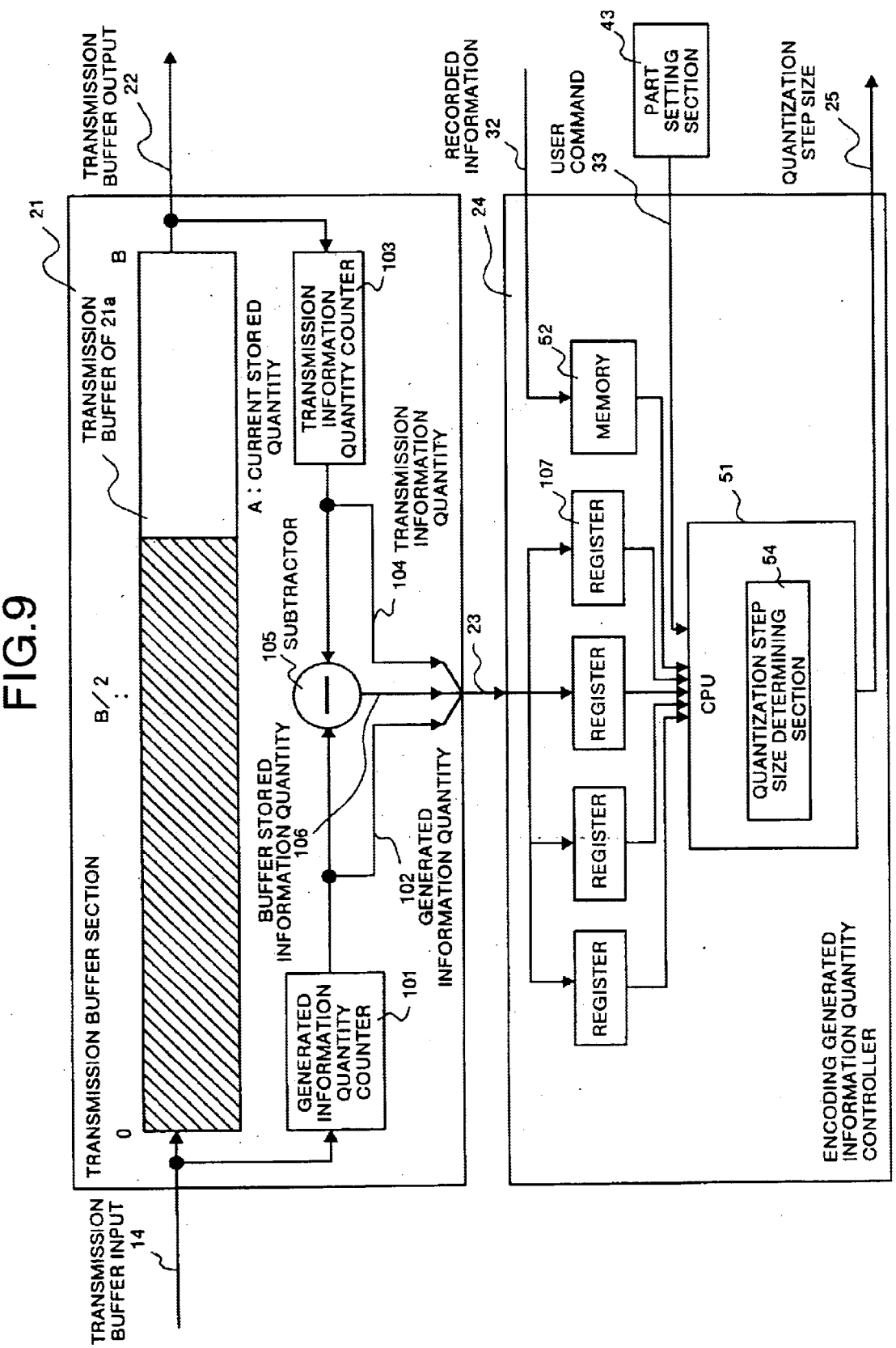
FIG. 9 is a block diagram showing a detailed structure of a transmission buffer section and an encoding generated information quantity controller within a dynamic image encoding apparatus in a fourth embodiment of the invention.

FIG. 9 is a diagram showing a detailed structure of the transmission buffer section 21 and the encoding generated information quantity controller 24 within the dynamic image encoding apparatus as the fourth embodiment of the invention. In FIG. 9, a part setting section 43 sets a part recording time which is a part of the recording time of the storage medium 31, sets a target bit rate in this set part recording time, and inputs the set part recording time and the set target bit rate to the CPU 51. The rest of the structure is the same as that of FIG. 1 and FIG. 2 respectively, and identical structure items are indicated by the identical reference numbers. However, as the target bit rate is set by the part setting section 43, the target bit rate calculating section 53 is not structured.

Figure 10:
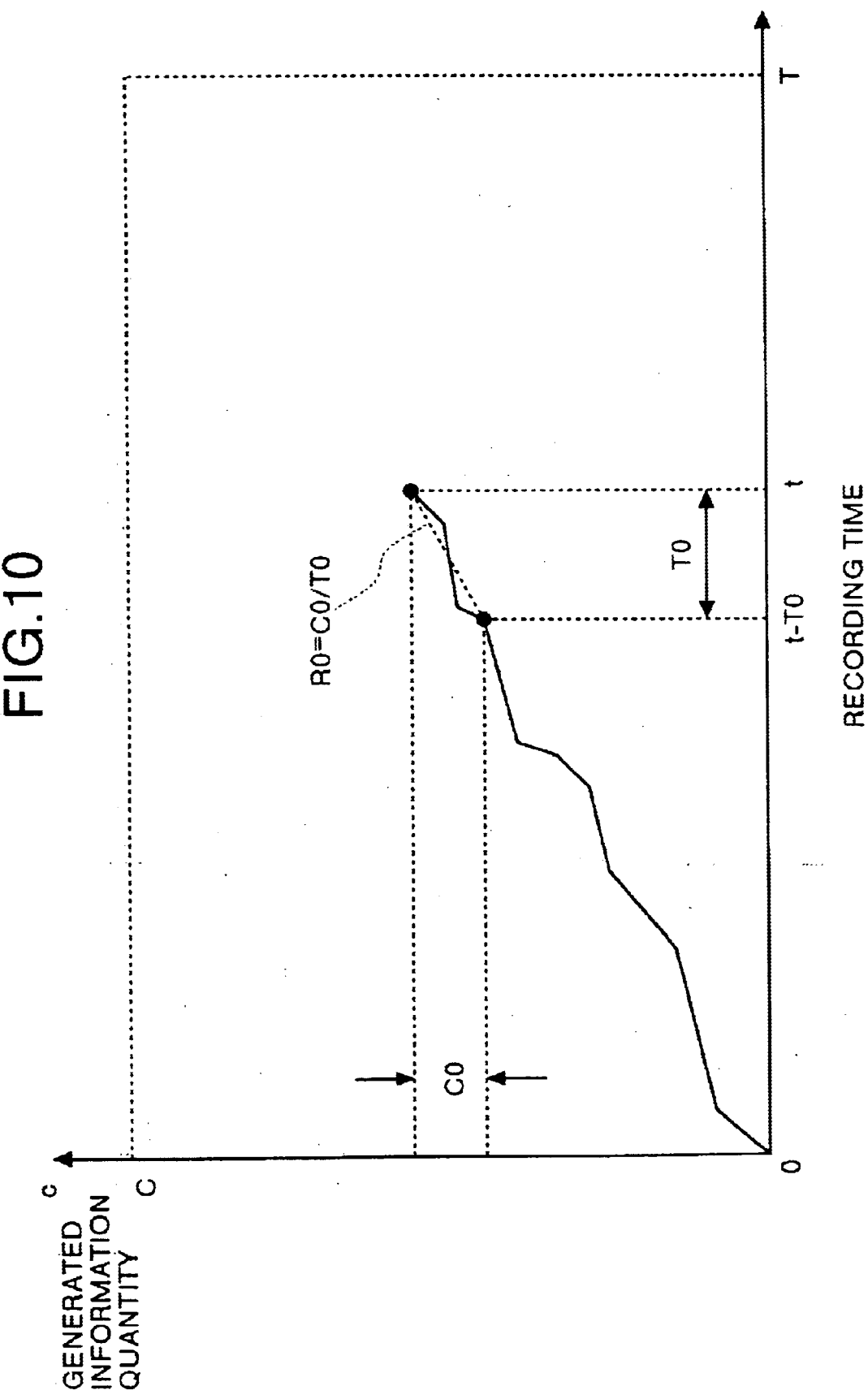
FIG. 10 shows a relationship between a recording time and a generated information quantity of a storage medium in the fourth embodiment of the invention.

The control processing of the CPU 51 will be explained with reference to FIG. 10. FIG. 10 shows a relationship between the recording time and the generated information quantity within one storage medium 31. A solid line expresses a relationship between a recording time and a generated information quantity of the information actually recorded in the recording area. The generated information quantity is finally equal to the storage capacity of the information stored in the storage medium 31.

In FIG. 10, a part recording time T0 and a target bit rate R0 (=C0/T0) during the part recording time T0 is set by the part setting section 43. C0 represents a part recording capacity during the part recording time T0. In this case, average bit rate R during the part recording time T0 becomes as follows.

$$R = C1/T0$$

In this case, C1 represents a generated information quantity during the part recording time T0. The quantization step size determining section 54 of the CPU 51 determines the quantization step size Q so that the average bit rate R does not exceed the target bit rate R0, and outputs the determined quantization step size Q to the quantizer 11 and the inverse quantizer 15, so as to control the average bit rate R.

When the fourth embodiment is used, a recording capacity CC of the dynamic image is controlled as follows by cutting out the dynamic image data of an optional recording time TT and by continuously setting the part recording time T0.

$$CC < n \cdot T0 \cdot R0$$

In this case, n represents an integer obtained by rounding up a fraction of a value of TT/T0. By carrying out a recording in the manner as described above, it is possible, for example, to record two image sequences of two storage mediums in one storage medium, when the two storage mediums store the two image sequences and when the total time of dynamic images data of the respective storage mediums becomes a total recording time T of one storage medium.

Accordingly, when for example two storage mediums store two image sequences, and the total of the recording times of the two image sequences is the recording time T of one storage medium, and when the image sequence is to be copied from the other one storage medium to one storage medium, the accommodation of the image sequence can be guaranteed by setting the margin to $2 \cdot T0 \cdot R0$.

According to this fourth embodiment, it is possible to set an optional part recording time within one storage medium 31 and a target bit rate during this part recording time, and to control the average bit rate for the recording during this part recording time to be not larger than the target bit rate. Therefore, a flexible recording control can be carried out.

Next, a fifth embodiment of the invention will be explained. In the fourth embodiment, an optional part recording time within one storage medium 31 and a target bit rate during this part recording time are set, and the average bit rate for the recording during this part recording time is controlled to be not larger than the target bit rate. However, in the fifth embodiment, the average bit rate is set as a function relating to time.

According to a structure of the fifth embodiment, the part setting section 43 in the structure shown in FIG. 9 sets a part recording time which is a part of the recording time of the storage medium 31 and also sets the target bit rate in the set part recording time as a function. The rest of the structure is the same as that shown in FIG. 9.

Figure 11:
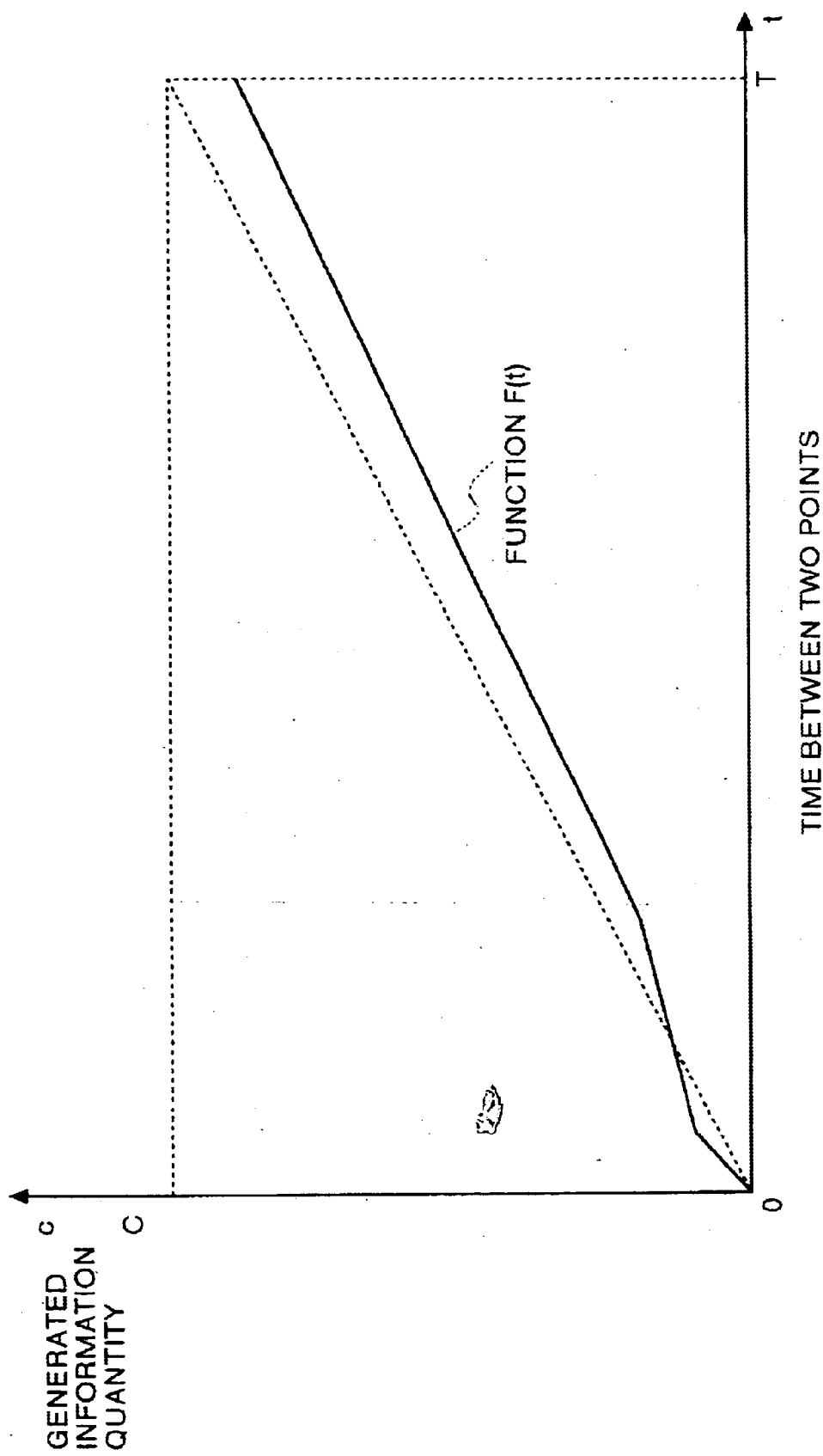
FIG. 11 shows a relationship between a recording time and a generated information quantity of a storage medium in a fifth embodiment of the invention.

FIG. 11 shows one example of a function set by the part setting section 43. A function F(t) set as shown in FIG. 11 is an optional function representing a generated information quantity in relation to time. By setting this function F(t), it becomes possible to control the bit rate in more detail.

Figure 12:
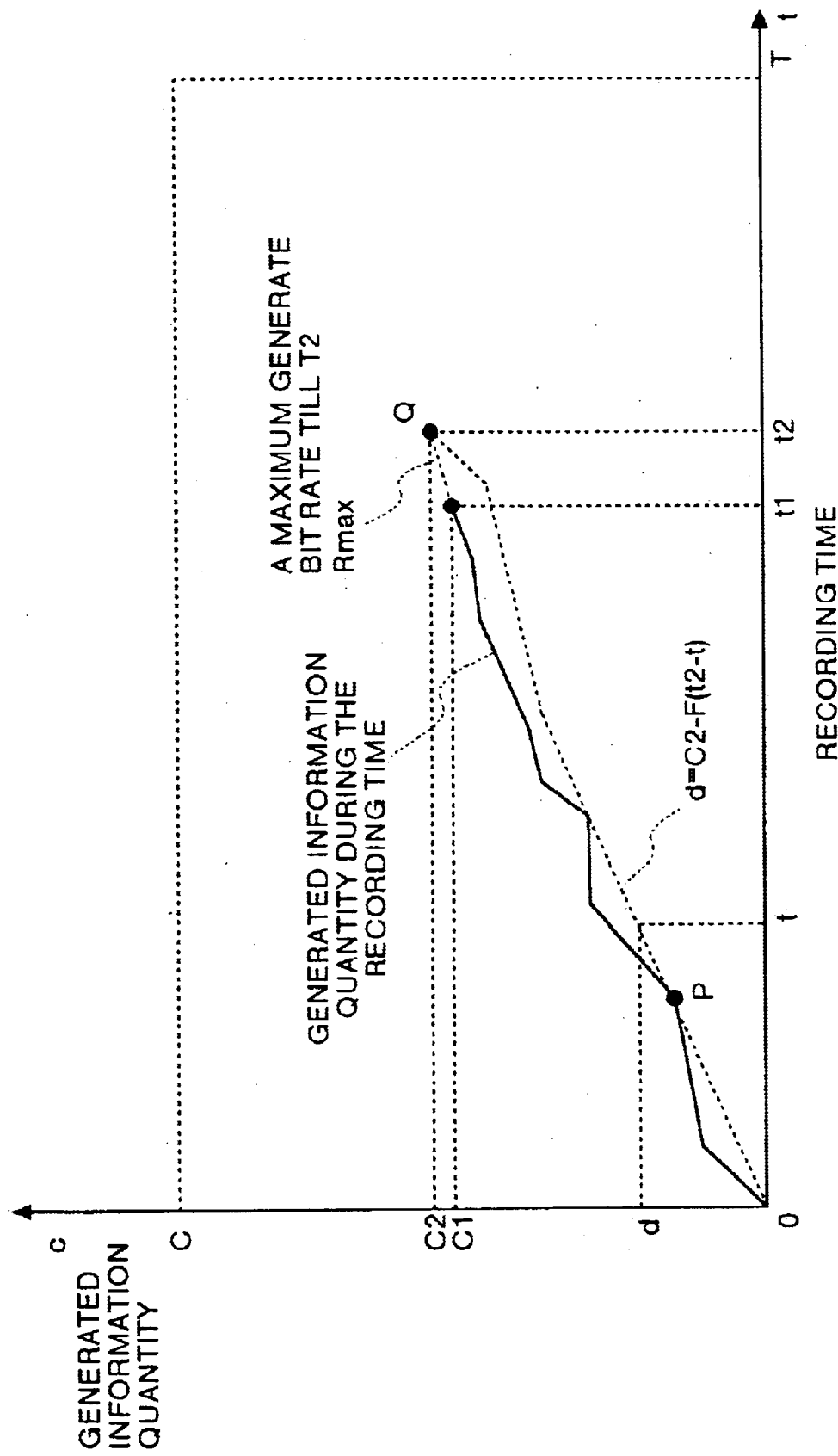
FIG. 12 shows a relationship between a recording time and a generated information quantity of a storage medium in the fifth embodiment of the invention.

FIG. 12 shows a relationship between a recording time and a generated information quantity when a function is used. FIG. 12 shows a case where it is possible to record information up to a recording capacity C1 by a current time t1 and then to record up to a recording capacity C2 by a time t2 which is a small time of a few seconds or several tens of seconds after the time t1. In this case, the recording capacity C2 is obtained so that a function d with a point P as an origin.

$$d=C2-F(t2-t)$$

and a curve of a generated information quantity during the recording time are in contact at a point Q. During a period from t1 to t2, the bit rate is controlled so as not to be equal to or above Rmax.

It is assumed that n image sequences are to be copied to one storage medium from a plurality of storage mediums recorded with information in the manner as described above, with a total recording time T. In this case, when the respective recording times are expressed as T1, T2, . . . and Tn, where T1+T2+. . . +Tn=T, a function F(t) is defined that makes it possible to establish the following relationship.

$$F(T1)+F(T2)+\ldots +F(Tn)<C$$

Then, it becomes possible to guarantee to accommodate the n image sequences in one storage medium.

According to the fifth embodiment, as the generated information quantity is defined by the function of time, and this function is used to control the recording, it is possible to carry out a flexible control of recording.

Next, a sixth embodiment of the invention will be explained. In the above-described embodiment, an obtained average bit rate is controlled to be within a target bit rate. However, in the sixth embodiment, a lower limit bit rate for guaranteeing a minimum picture quality is set, and an upper limit bit rate is set for preventing an inefficient improvement of picture quality.

Figure 13:
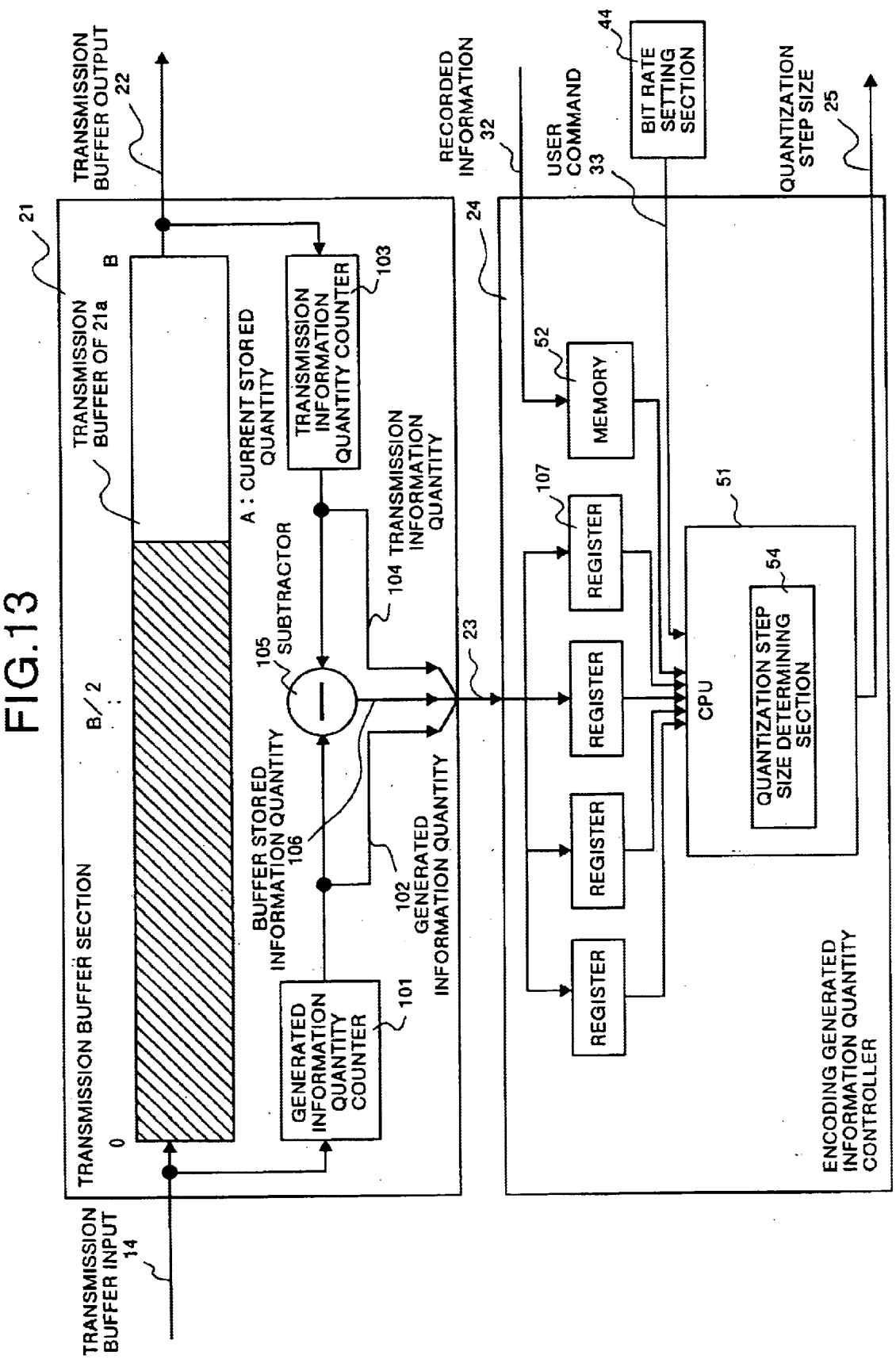
FIG. 13 is a block diagram showing a detailed structure of a transmission buffer section and an encoding generated information quantity controller within a dynamic image encoding apparatus in a sixth embodiment of the invention.

FIG. 13 is a diagram showing a detailed structure of the transmission buffer section 21 and the encoding generated information quantity controller 24 within the dynamic image encoding apparatus of the sixth embodiment. In FIG. 13, a bit rate setting section 44 sets a lower limit bit rate for guaranteeing a minimum picture quality and an upper limit bit rate for preventing an inefficient improvement of picture quality. When the lower limit bit rate has been set, a quantization step size determining section 54 of the CPU 51 determines a quantization step size which is always not equal to or smaller than this lower limit bit rate. When the upper limit bit rate has been set, the quantization step size determining section 54 determines a quantization step size which is always not equal to or larger than this higher limit bit rate. This structure can be applied in duplicate to the above-described embodiment.

Figure 14:
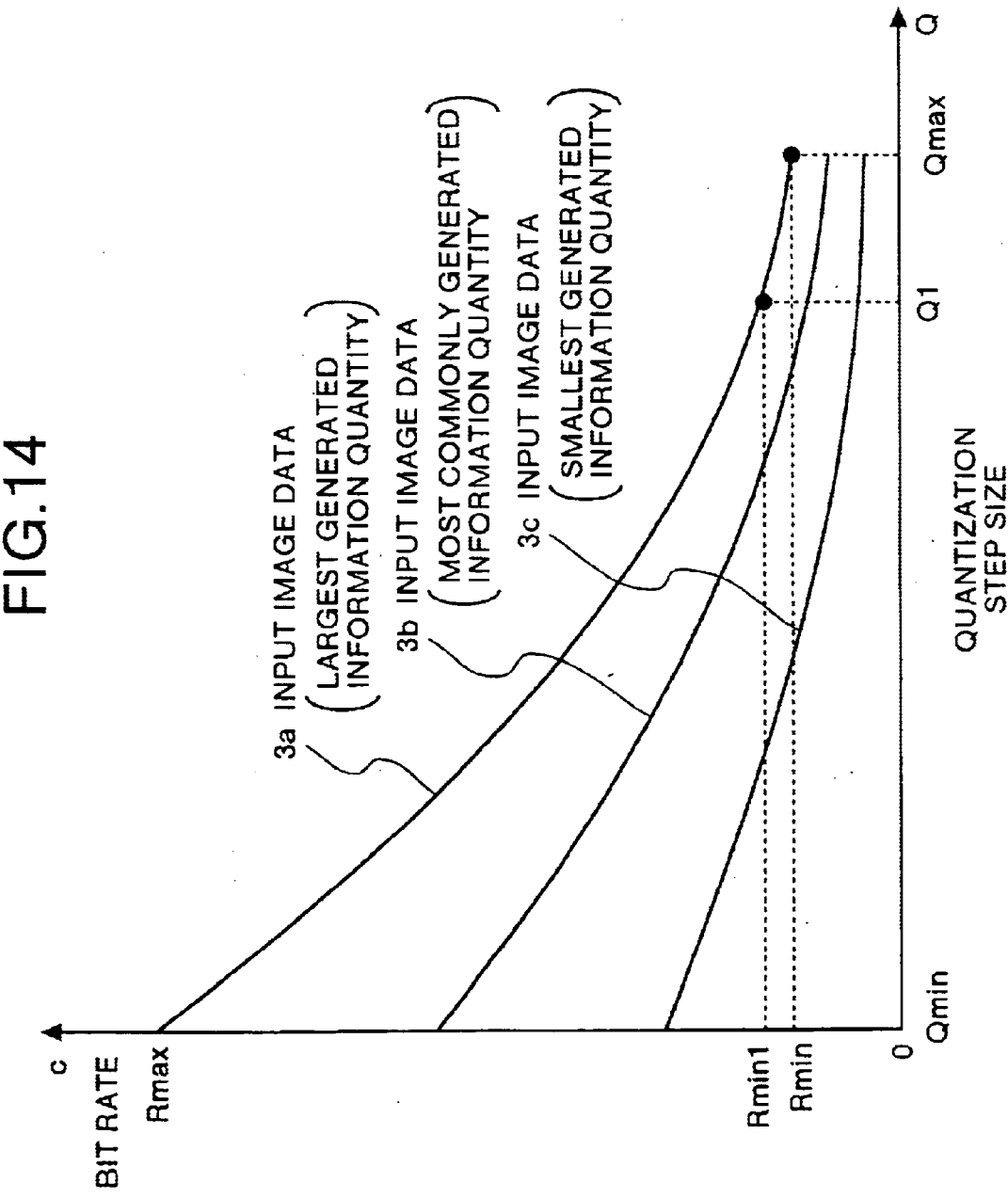
FIG. 14 shows a relationship between a quantization step size and a bit rate.

The setting content of the lower limit bit rate will be explained with reference to FIG. 14. FIG. 14 shows a relationship between a quantization step size and a bit rate. In FIG. 14, a curve 3a shows this relationship when input image data has a largest generated information quantity, a curve 3b shows this relationship when input image data has most commonly generated information quantity, and a curve 3c shows this relationship when input image data has a smallest generated information quantity.

In order to guarantee the accommodation of data of a prescribed capacity within a prescribed time during a recording time, it is necessary to adapt to the input image data having a largest generated information quantity. For this purpose, a bit rate not smaller than the bit rate Rmin is necessary when the quantization step size Q is a maximum value Qmax of the standard. Accordingly, it is necessary to control so that the average bit rate R is not equal to or smaller than the bit rate Rmin.

However, when the average bit rate is controlled so as not to be equal to or smaller than the bit rate Rmin, there is a risk of deterioration of the picture quality. In order to guarantee a minimum picture quality, a maximum value of the quantization step size is limited to Q1, and the average bit rate R is controlled so as not to be equal to or smaller than a bit rate Rmin1. With this arrangement, it is possible to guarantee the minimum picture quality at all times.

Figure 15:
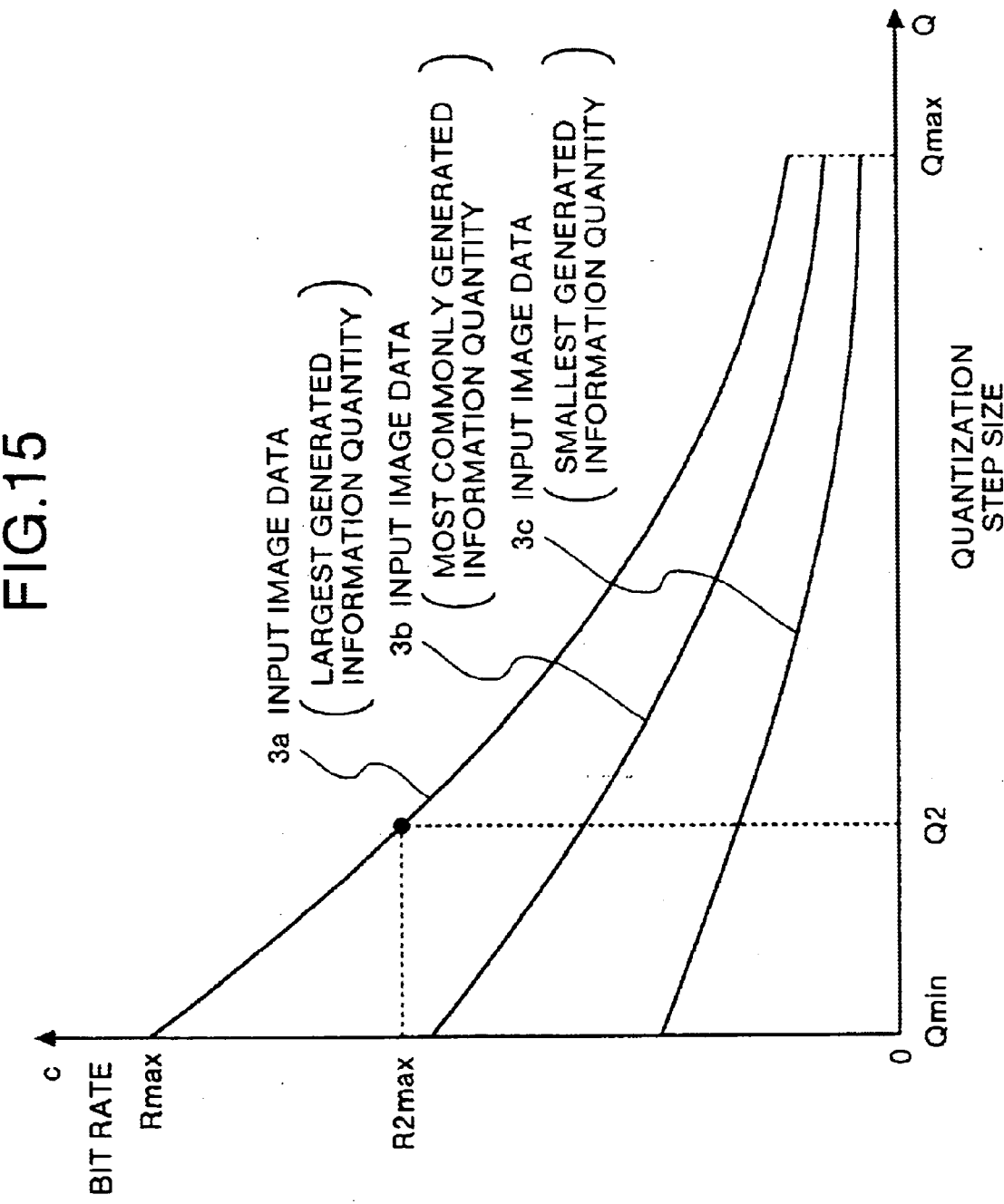
FIG. 15 shows a relationship between a quantization step size and a bit rate.

On the other hand, FIG. 15 shows a relationship between a quantization step size and a bit rate for explaining the upper limit bit rate. In FIG. 15, curves 3a to 3c are the same as those in FIG. 14. The curve 3a shows this relationship when input image data has a largest generated information quantity, a curve 3b shows this relationship when input image data has most commonly generated information quantity, and a curve 3c shows this relationship when input image data has a smallest generated information quantity.

In FIG. 15, when the quantization step size Q is made smaller, the generated information quantity increases extremely. The increase in the generated information quantity not contributing to the improvement of picture quality results in a reduction in the efficiency of picture quality improvement. To avoid this problem, the average bit rate R is set to be not larger than a bit rate R2max so that a quantization step size Q2 becomes a minimum value of the quantization step size Q, so as to carry out a forced control.

In the above explanation, the bit rate is set to the lower limit bit rate Rmin1 or the upper limit bit rate R2max. Alternately, corresponding quantization step sizes Q1 and Q2 may be set.

Figure 16:
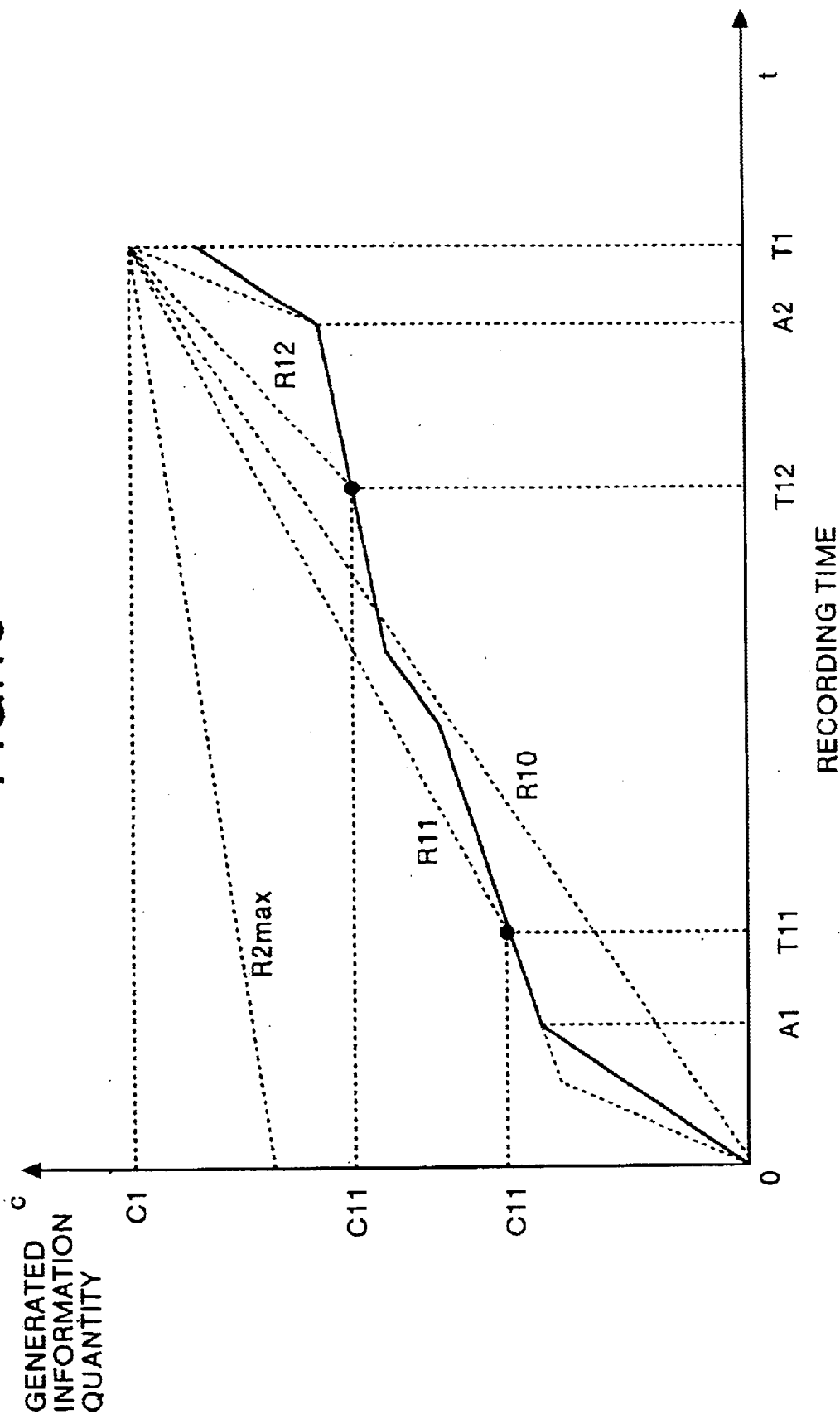
FIG. 16 shows a relationship between a recording time and a generated information quantity of a storage medium in a sixth embodiment of the invention.

FIG. 16 shows a relationship between a recording time and a generated information quantity when the sixth embodiment is applied, and this has a relationship corresponding to the second embodiment shown in FIG. 5. The generated information quantities during a period from time 0 to time A1 and during a period from time A2 to time T1 respectively becomes as shown by a broken line when the second embodiment is applied. However, when the upper limit bit rate of this sixth embodiment is set, the bit rate can be restricted to be not larger than the upper limit bit rate R2max, so that an efficient control of the recording can be achieved. Particularly, a final generated information quantity can be restricted.

According to the sixth embodiment, the lower limit bit rate or the upper limit bit rate is set to carry out a forced control. Therefore, it is possible to guarantee the minimum picture quality and to prevent an efficient picture quality improvement.

Next, a seventh embodiment of the invention will be explained. In the seventh embodiment, a picture quality is set and input, and a quantization step size corresponding to this set and input picture quality is determined, so as to control to have a constant picture quality.

Figure 17:
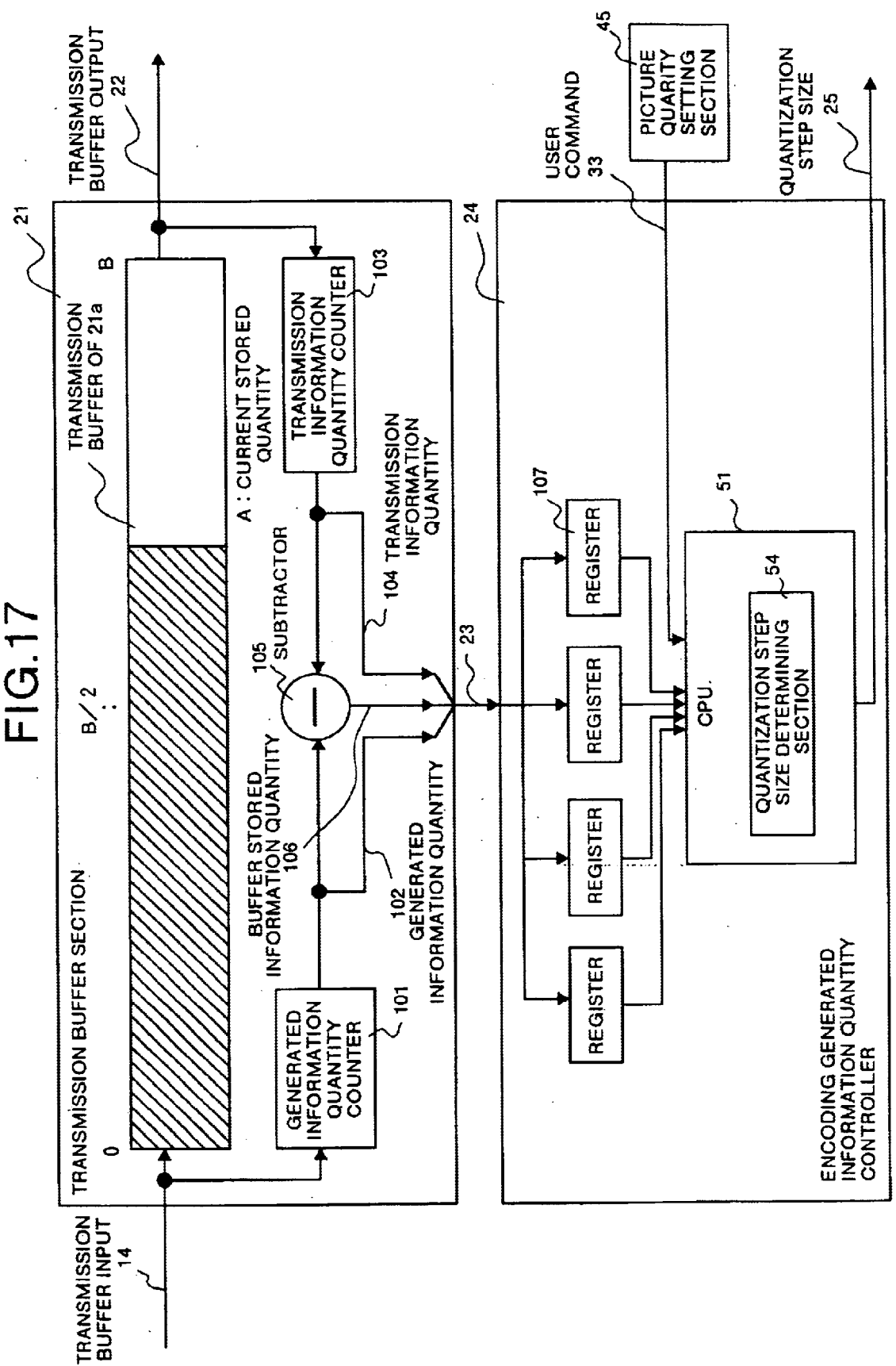
FIG. 17 is a block diagram showing a detailed structure of a transmission buffer section and an encoding generated information quantity controller within a dynamic image encoding apparatus in a seventh embodiment of the invention.

FIG. 17 is a block diagram showing a detailed structure of a transmission buffer section 21 and an encoding generated information quantity controller 24 within a dynamic image encoding apparatus in the seventh embodiment of the invention. In FIG. 17, a picture quality setting section 45 sets and inputs a picture quality that a user desires. The set and input picture quality information is output to a CPU 51. A quantization step size determining section 54 within the CPU 51 determines a quantization step size corresponding to a picture quality set and input, from a corresponding relationship between a picture quality and a quantization step size held within a relationship table not shown. The CPU 51 controls to make the picture quality of the image data constant, by the quantization step size determined. The rest of the structure is the same as that of the second embodiment shown in FIG. 4. However, the structure of the memory 52 is not necessary, and the recorded information 32 is not input.

Figure 18:
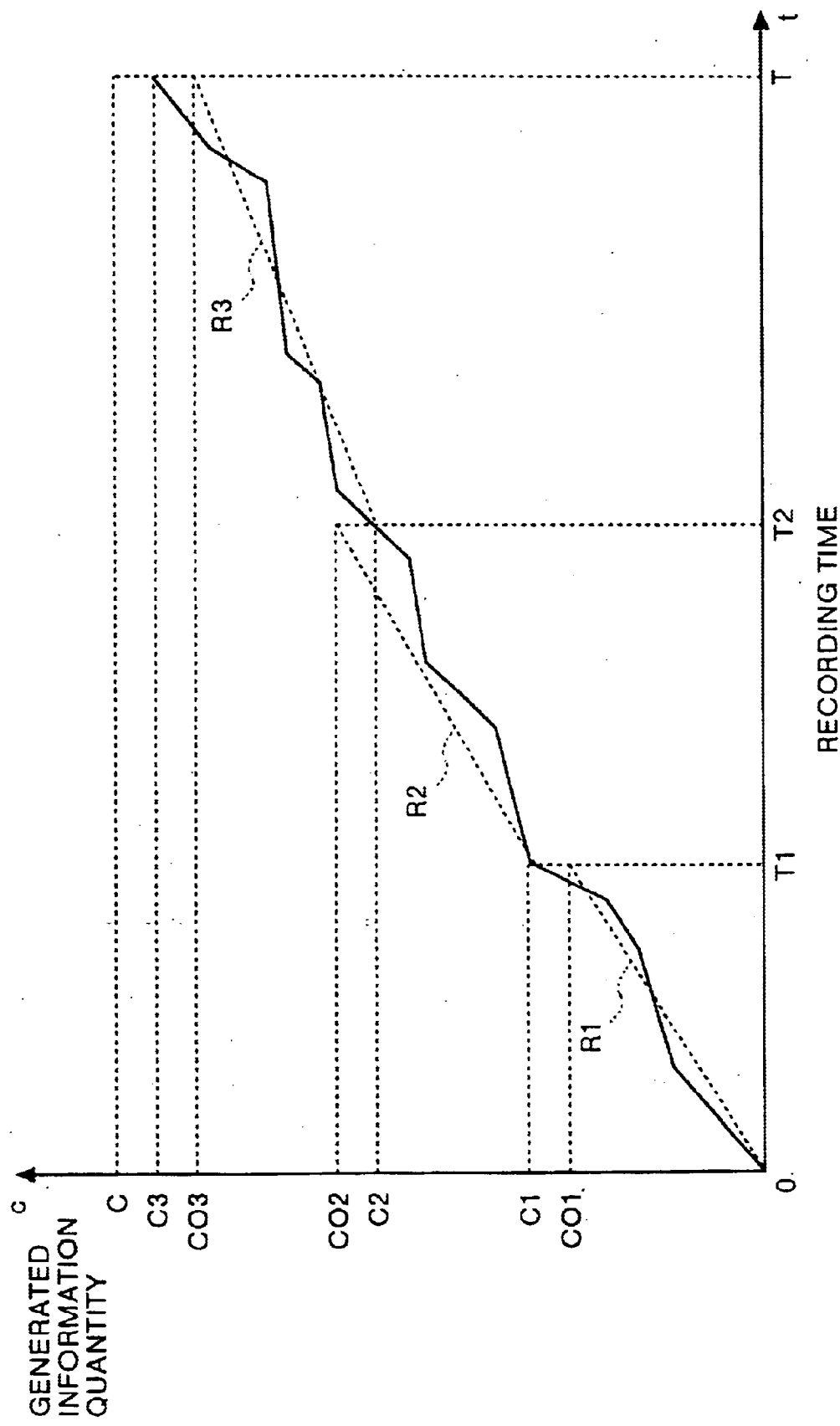
FIG. 18 shows a relationship between a recording time and a generated information quantity of a storage medium in the seventh embodiment of the invention.

FIG. 18 shows a relationship between a recording time and a generated information quantity of a storage medium when the seventh embodiment of the invention is applied. When the picture quality setting section 45 has set and input a picture quality, for example, a high picture quality, a standard picture quality or a low picture quality, a quantization step size corresponding to the set picture quality is determined. In the case of FIG. 18, a picture quality is set at each point of time of time 0, time T1 and time T2. Bit rates R1, R2 and R3 shown in FIG. 18 represent values corresponding to the quantization step sizes according to the picture qualities set at the time 0, time T1 and time T2 respectively.

As a picture quality can be set in the seventh embodiment, it is possible to control the recording as dynamic image data having a constant picture quality.

Next, an eighth embodiment of the invention will be explained. In the eighth embodiment, various storage mediums for recording at a variable rate are set to display a recording time and a recording capacity of each storage medium based on a bit rate of a standard picture quality.

Figure 19:
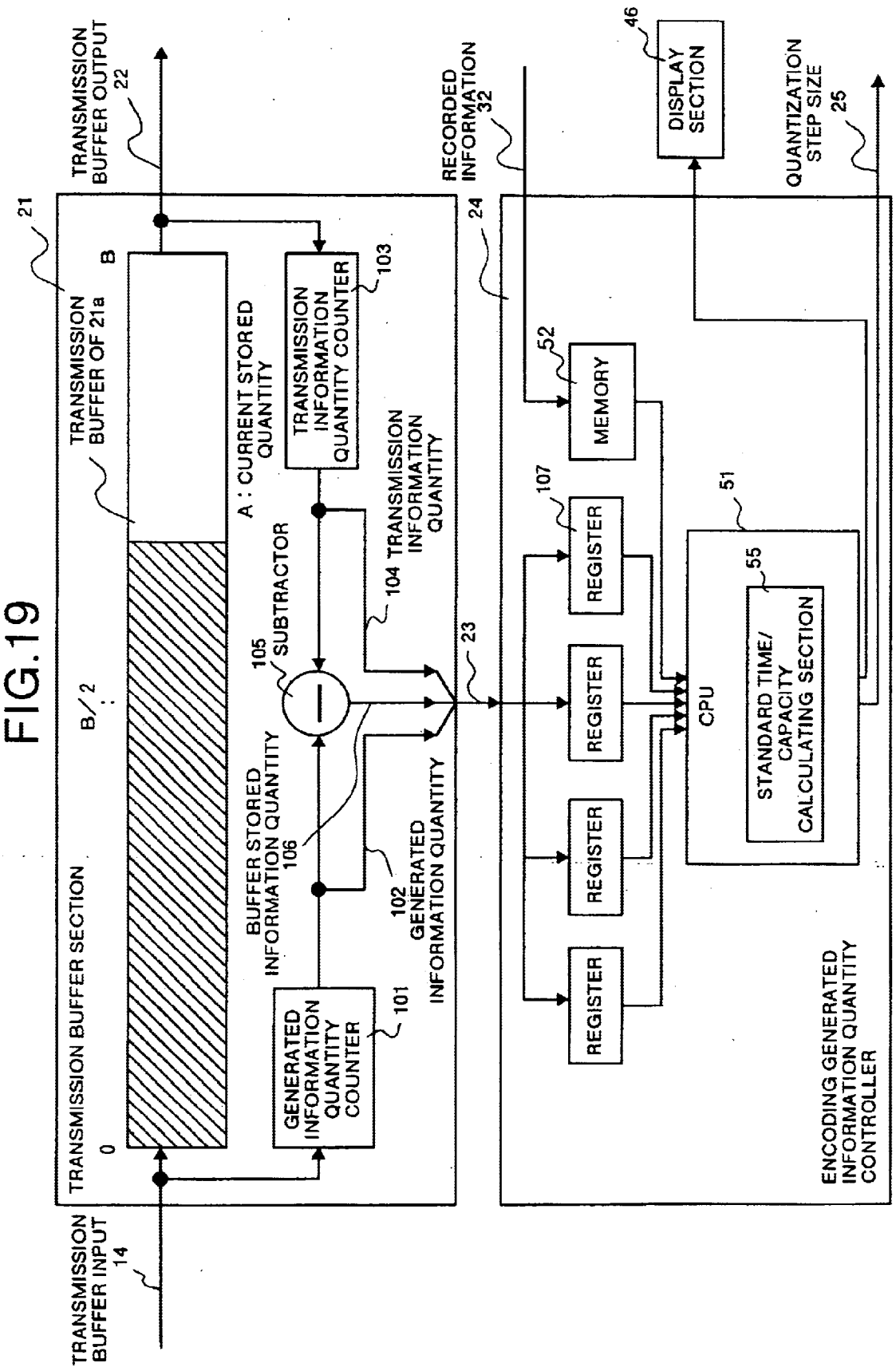
FIG. 19 is a block diagram showing a detailed structure of a transmission buffer section and an encoding generated information quantity controller within a dynamic image encoding apparatus in an eighth embodiment of the invention.

FIG. 19 is a block diagram showing a detailed structure of a transmission buffer section 21 and an encoding generated information quantity controller 24 within a dynamic image encoding apparatus according to the eighth embodiment of the invention. In FIG. 19, a standard time/capacity calculating section 55 calculates a recording time and a recording capacity when information has been recorded in a storage medium 31 at a bit rate of a standard picture quality, and a display section 46 displays the result of the output of the calculation.

The reason why the recording time and the recording capacity of the storage medium 31 are displayed is that there are actually various kinds of storage mediums having various kinds of recording capacities so that the actual recording time may change for the same recording capacity as the information is recorded at a variable bit rate.

However, when a bit rate of a standard picture quality is used, it is possible to determine a recording time and recording capacity as constant for the storage medium 31. For example, when it is assumed that the bit rate of a standard picture quality is prescribed as 4 Mb/s, the bit rate of a low picture quality is prescribed as 2 Mb/s, and the bit rate of a high picture quality is prescribed as 8 Mb/s, then a standard capacity C for one hour as, $$C=4(Mb/s \cdot 60 \cdot min \ 60 \ sec)=14,400 \ (Mb/s)=1.8 \ (Gbytes)$$

In actual practice, it is necessary to correct portions of redundancy of voice and other data and error tolerance. In the low picture quality mode for recording information at the bit rate of the low picture quality, it is possible to record for a two-time period of the time required for the standard mode for recording at the bit rate of the standard picture quality. In the high picture quality mode for recording information at the bit rate of the high picture quality, it is possible to record for a one-half time period of the time required for the standard mode.

According to the eighth embodiment, a recording time and a recording capacity are calculated based on the bit rate of the standard picture quality, and they are displayed. Accordingly, when a storage medium has various modes including the low picture quality mode for recording for long hours and the high picture quality mode for recording for short hours, the user can easily know it is possible to record for a time determined based on the total of recording hours in each mode.

Next, a ninth embodiment of the invention will be explained. In the ninth embodiment, an actual recording capacity of a storage medium is converted into a recording time through a recording capacity of a bit rate of the standard picture quality, and this is displayed.

Figure 20:
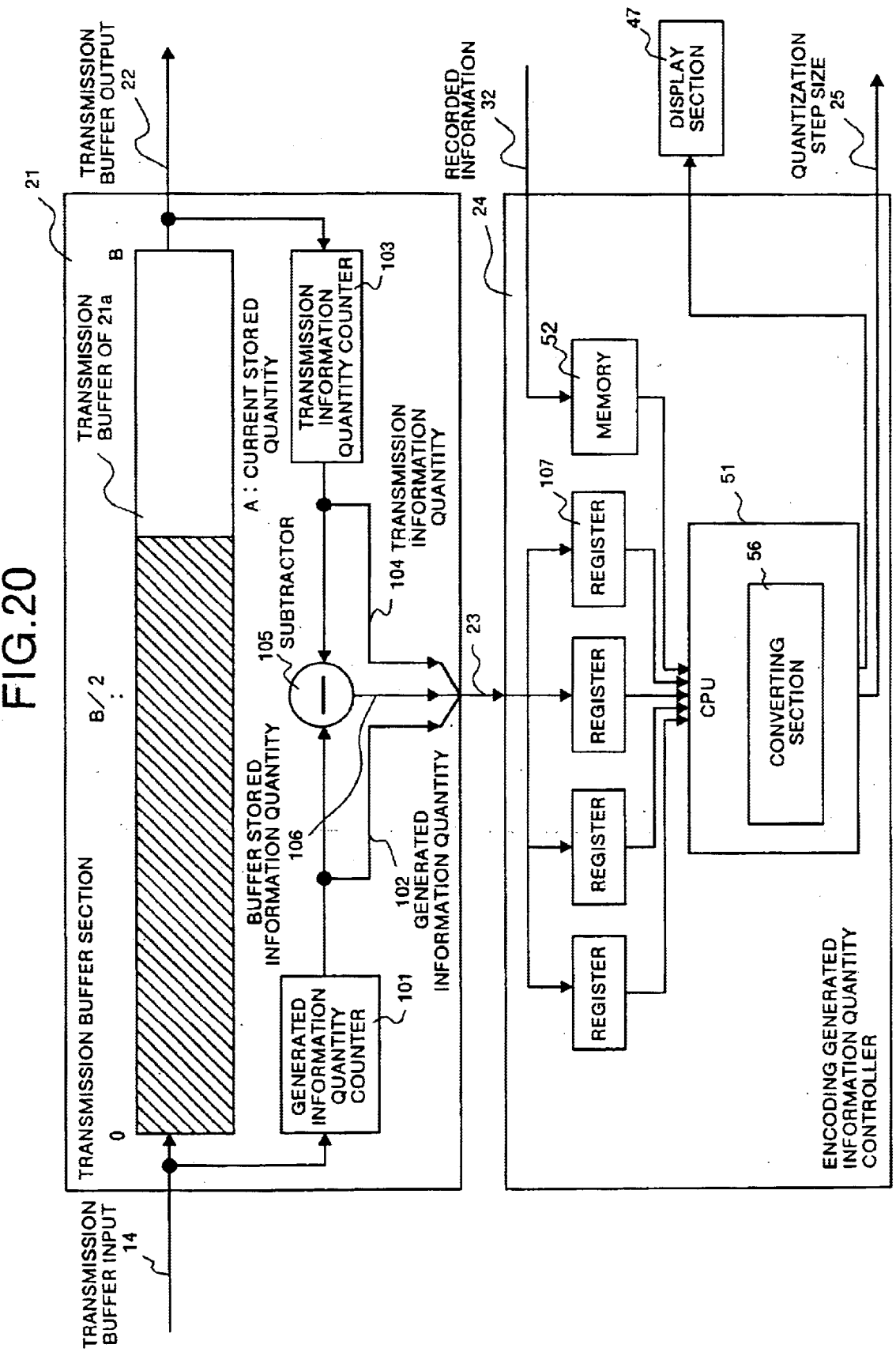
FIG. 20 is a block diagram showing a detailed structure of a transmission buffer section and an encoding generated information quantity controller within a dynamic image encoding apparatus in a ninth embodiment of the invention.

FIG. 20 is a block diagram showing a detailed structure of a transmission buffer section 21 and an encoding generated information quantity controller 24 within a dynamic image encoding apparatus according to the ninth embodiment of the invention. In FIG. 20, a converting section 56 obtains a recording capacity of a storage medium 31 at a current time, converts the obtained recording capacity into a recording time corresponding to this recording capacity by using a bit rate of a standard picture quality, and displays an obtained output result in a display section 47. The reason for converting a recording capacity into a recording time corresponding to this recording capacity by using the bit rate of the standard picture quality is that it is not easy for the user to obtain a corresponding relationship between the recording capacity and the recording time.

Figure 21:
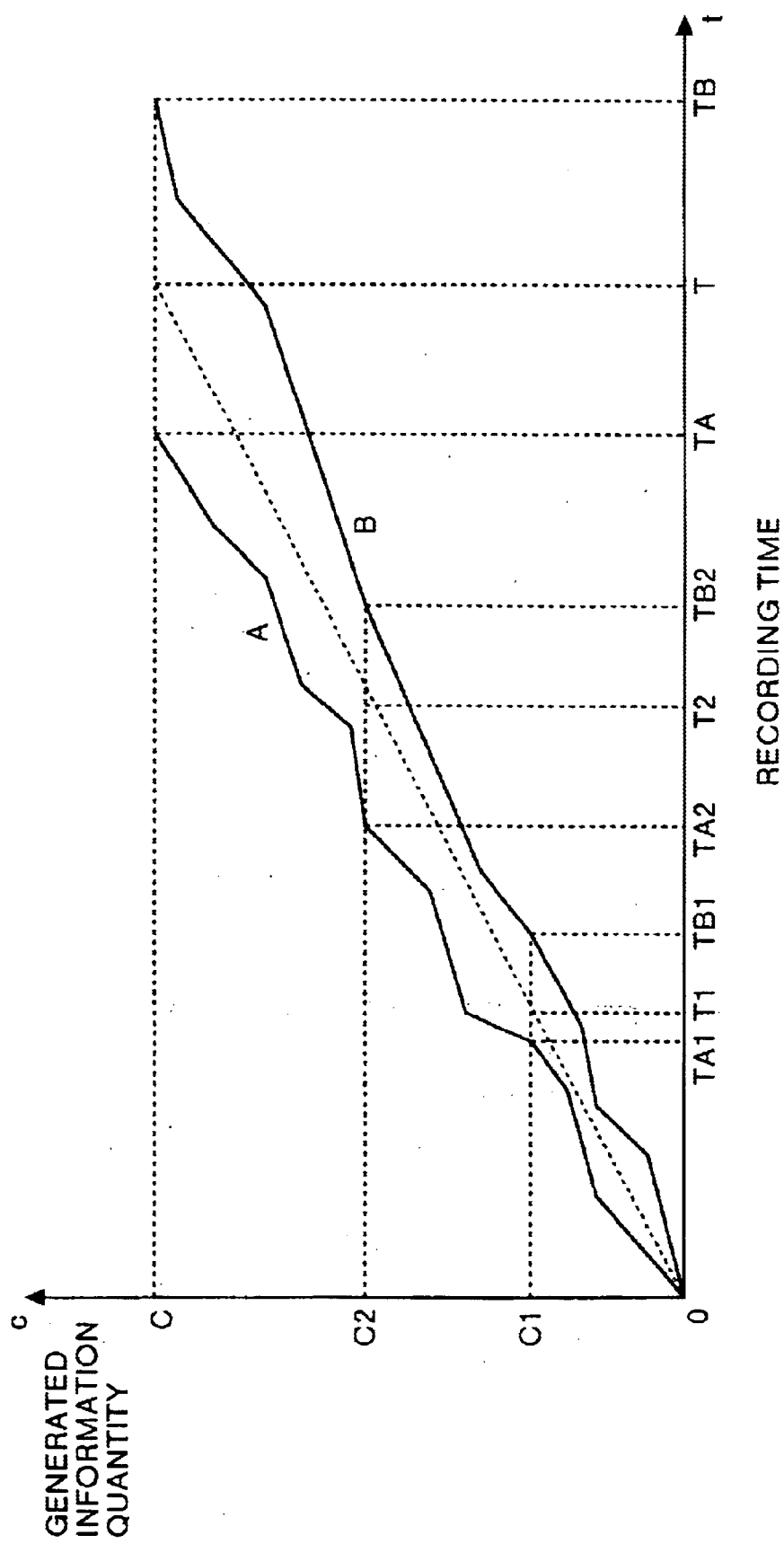
FIG. 21 shows a relationship between a recording time and a generated information quantity of a storage medium in the ninth embodiment of the invention.
Figure 22:
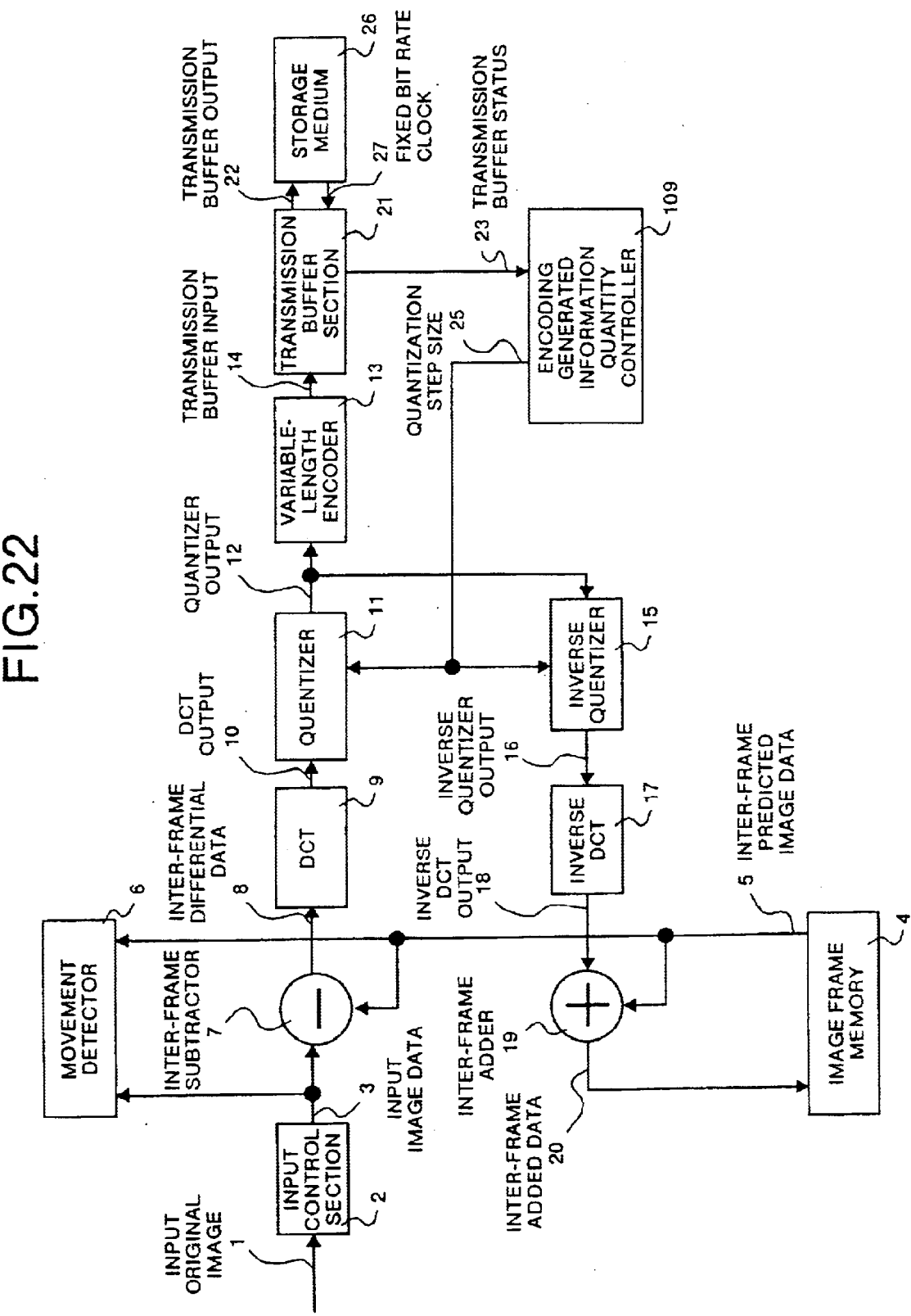
FIG. 22 is a block diagram showing an overall structure of a conventional dynamic image encoding apparatus.
Figure 23:
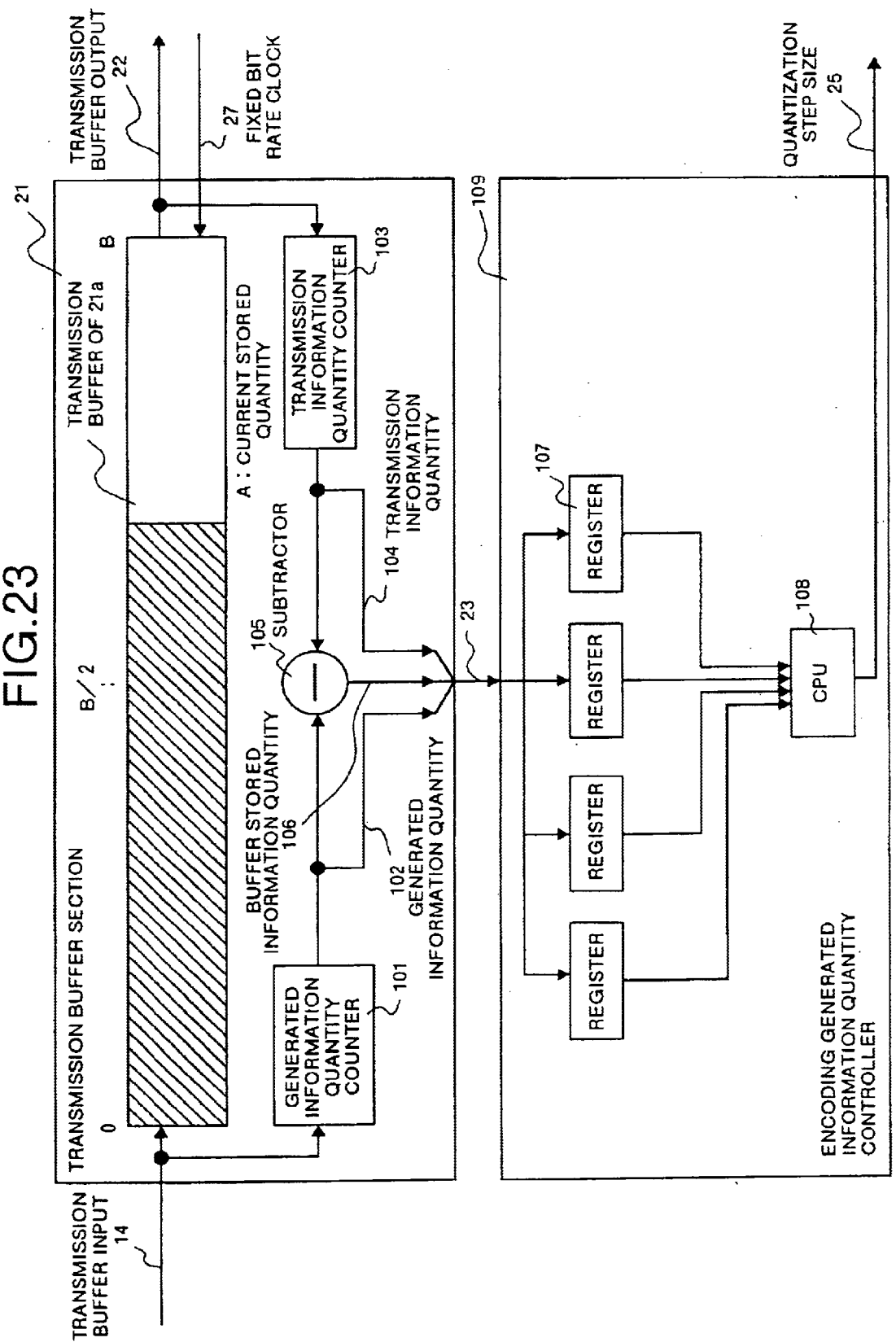
FIG. 23 is a block diagram showing a detailed structure of a transmission buffer section and an encoding generated information quantity controller within the conventional dynamic image encoding apparatus.
Figure 24:
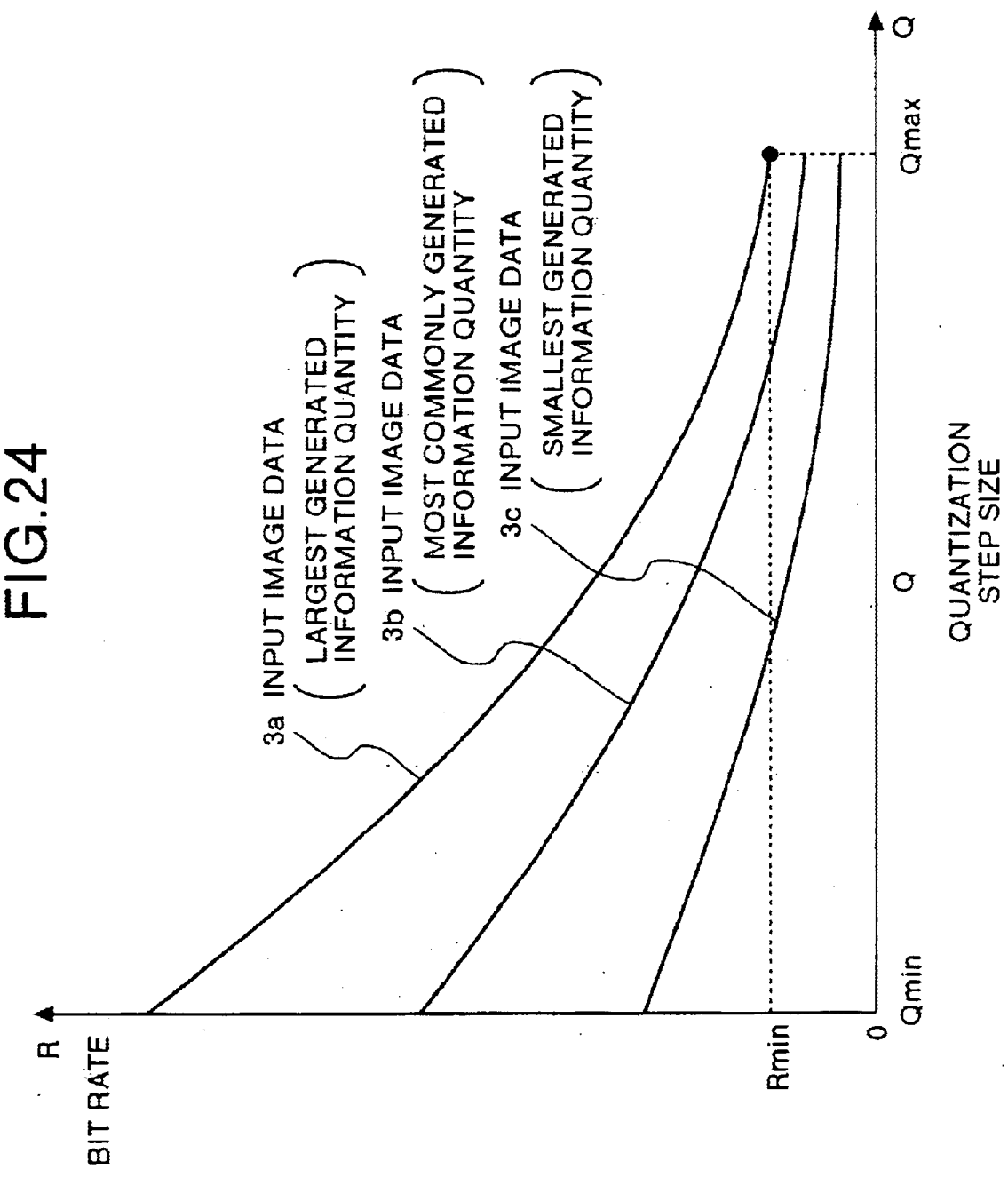
FIG. 24 shows a relationship between quantization step size and a bit rate.
Figure 25:
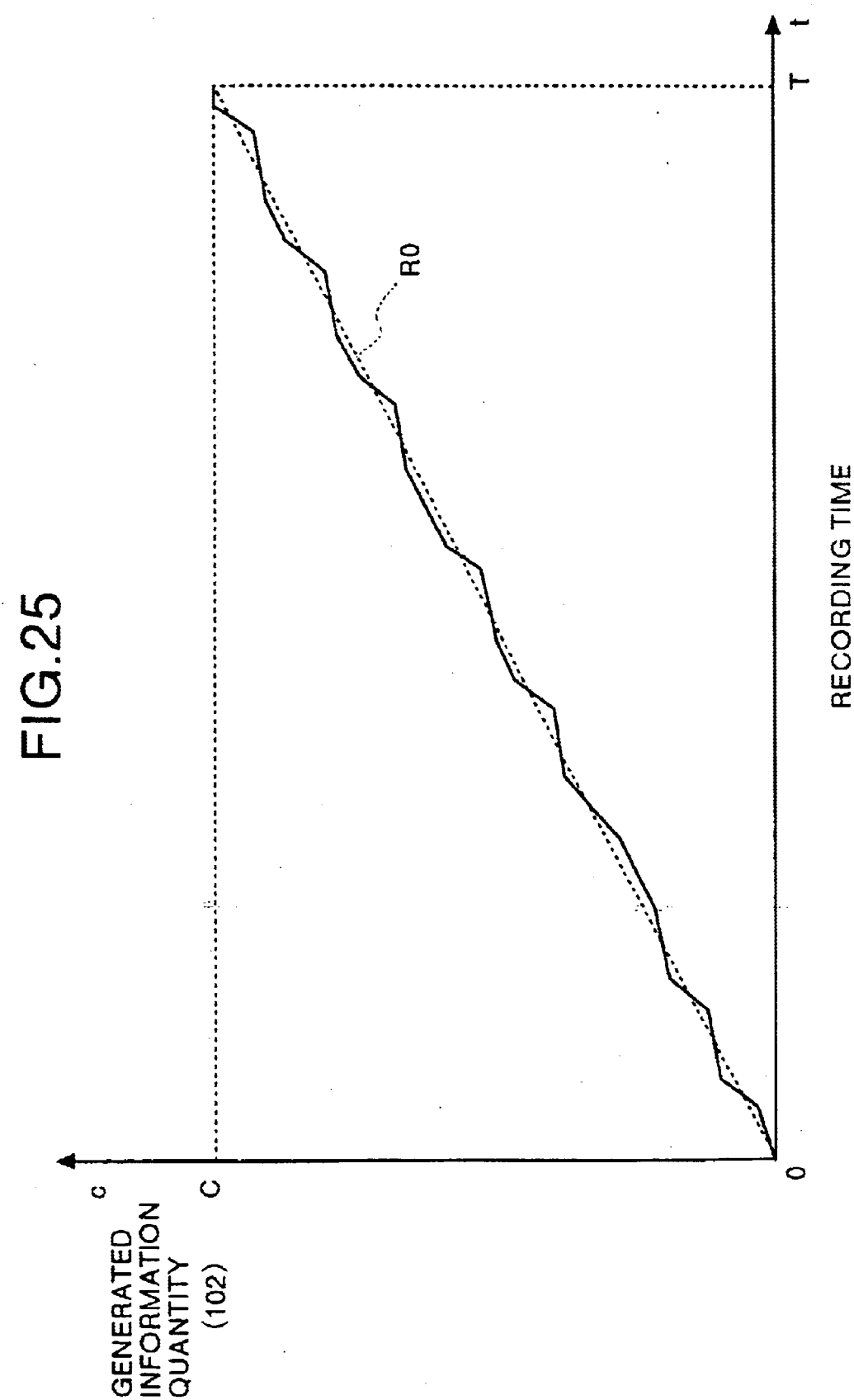
FIG. 25 shows a relationship between a recording time and a generated information quantity of a storage medium in the conventional dynamic image encoding apparatus.

The conversion processing by the converting section 56 will be explained with reference to FIG. 21. In FIG. 21, in the case where information can be recorded for a time period of T at a bit rate of a standard picture quality in a prescribed capacity C, an actual recording time may increase or decrease from T when there are a high picture quality mode and a low picture quality mode in the course of the recording. In considering an actual remaining recording time in a storage medium by managing the recording time, it is not possible to carry out a suitable management of the actual recording time.

FIG. 21 shows two ways of recording results as curves A and B. In the curve A, when information has been recorded till a time TA1, the generated information quantity is C1. In this case, the following conversion is carried out.

$$T1=C1/R0$$

$$=C \cdot T/C$$

It is possible to manage the recording time based on this converted recording time T1. In the above, R0 represents a bit rate of the standard picture quality, C represents a recording capacity of one storage medium, and T represents a prescribed recording time at the time of recording at the bit rate of the standard picture quality.

According to the ninth embodiment, the recording time can be managed by a recording time converted into a recording time of the standard bit rate. Therefore, the user can manage the recording time based on the relationship between the recording capacity and the recording time.

The above-described first to ninth embodiments can be applied in duplication, and may be suitably combined. In the above-described first to ninth embodiments, the transmission buffer output 22 is output to the storage medium 31. However, it is clear that it is also possible to output the transmission buffer output 22 to a remote storage medium by using channels.

As explained above, according to the present invention, the obtaining unit obtains a recording capacity and a recording time of recorded information sequentially recorded on the storage medium, the calculating unit obtains a remaining recording capacity and a remaining recording time of the storage medium from the recording capacity and the recording time obtained by the obtaining unit, and calculates a target bit rate at and after the current time from the remaining recording capacity and the remaining recording time, and the control unit controls the variable bit rate to sequentially change its quantization step size to a quantization step size for maintaining a level not larger than the target bit rate. Therefore, this invention has an effect that it is possible to guarantee to accommodate dynamic image data of a variable bit rate having a recording time of a storage medium within the recording time of the storage medium and within a recording capacity of the storage medium.

According to the next invention, the division setting unit divides and sets a recording area of the storage medium into a plurality of divided recording areas, the obtaining unit obtains a recording capacity and a recording time of recorded information sequentially recorded in each of the divided recording areas, the calculating unit obtains a remaining recording capacity and a remaining recording time for each of the divided recording areas from the recording capacity and the recording time obtained by the obtaining unit, and calculates a target bit rate at and after the current time from the remaining recording capacity and the remaining recording time, and the control unit controls the variable bit rate to sequentially change its quantization step size to a quantization step size for maintaining a level not larger than the target bit rate. Therefore, this invention has an effect that it is possible to guarantee to accommodate dynamic image data of a variable bit rate having a recording time of a storage medium within the recording time of the storage medium and within a recording capacity of the storage medium. Further, there is an effect that in the case of making a copy in the units of image sequence, it is possible to guarantee to record within a total recording time of all the image sequences by carrying out an encoding by allocating a recording time to each image sequence in advance.

According to the next invention, the division setting unit divides the recording area into a plurality of equally divided recording areas, and the variable bit rate is controlled to sequentially change its quantization step size to a quantization step size for maintaining not larger than the target bit rate. Therefore, this invention has an effect that it is possible to guarantee to accommodate dynamic image data of a variable bit rate having a recording time of a storage medium within the recording time of the storage medium and within a recording capacity of the storage medium. Further, there is an effect that in the case of making a copy in the units of image sequence, it is easily possible to guarantee to record within a total recording time of all the image sequences by carrying out an encoding by allocating a recording time to each image sequence in advance. Furthermore, there is an effect that it is possible to record without an extreme deviation of a generated information quantity in each divided recording area.

According to the next invention, the setting unit sets a target bit rate in a predetermined prescribed recording time of recorded information sequentially recorded in the storage medium, the obtaining unit obtains a recording capacity and a recording time of recorded information sequentially recorded on the storage medium, the calculating unit calculates an average bit rate at the current time from a recording capacity and a recording time obtained by the obtaining unit after starting the prescribed recording time, and the control unit controls the average bit rate to sequentially change its quantization step size to a quantization step size for maintaining a level not larger than the target bit rate for each of the prescribed recording time. Therefore, this invention has an effect that it is possible to guarantee to accommodate dynamic image data of a variable bit rate having a part recording time of a storage medium within the part recording time of the storage medium and within a part recording capacity of the storage medium.

According to the next invention, the setting unit sets the target bit rate as a function of the target bit rate for the prescribed recording time, and the control unit controls the quantization step size so that a maximum generated information quantity between optional recording positions becomes not larger than a maximum generated information quantity of the function. Therefore, this invention has an effect that it is possible to guarantee flexibly and in detail to accommodate dynamic image data of a variable bit rate having a part recording time of a storage medium within the part recording time of the storage medium and within a part recording capacity of the storage medium.

According to the next invention, the first setting unit sets a lower limit bit rate for guaranteeing a picture quality of not lower than a first predetermined level, and the control unit forcibly controls at least the variable bit rate to sequentially change its quantization step size to a quantization step size for maintaining a level not smaller than the lower limit bit rate. Therefore, this invention has an effect that it is possible to guarantee a minimum picture quality when dynamic image data of a prescribed recording time is to be forcibly accommodated in a prescribed recording capacity.

According to the next invention, the second setting unit sets an upper limit bit rate for making a picture quality to be maintained at a level not higher than a second predetermined level, and the control unit forcibly controls at least the variable bit rate to sequentially change its quantization step size to a quantization step size for maintaining a level not larger than the upper limit bit rate. Therefore, this invention has an effect that it is possible to prevent an inefficient improvement of picture quality such as a wasteful use of a recording area by forcibly increasing the picture quality when there is a surplus recording capacity for a target, in accommodating dynamic image data of a prescribed capacity time in a prescribed recording capacity.

According to the next invention, the setting and inputting unit sets and inputs a desired picture quality, the control unit obtains a quantization step size corresponding to the desired picture quality set and input by the set and input unit from a relationship table for storing a relationship between the desired picture quality and a quantization step size corresponding to the picture quality, and controls encoding of the dynamic image by using the obtained quantization step size. Therefore, this invention has an effect that it is possible to obtain a variable bit rate control method for obtaining a uniform picture quality. Further, it is possible to match an approximate value of a generated information quantity at the time of recording for a prescribed time. Furthermore, it is possible to easily match an approximate value of a generated information quantity to be stored or a recording time based on the sense of the user.

According to the next invention, the arithmetic unit calculates a recording capacity and a recording time for a case where information has been recorded on the storage medium based on a bit rate of a standard picture quality, and the display unit displays as output the recording capacity and the recording time calculated by the arithmetic unit. Therefore, this invention has an effect that it is possible to guarantee the recording in a time determined based on a total recording time of all modes of recording when there are various recording modes including a long-time recording mode, a high picture quality mode and the like.

According to the next invention, the converting unit obtains a recording capacity of the storage medium at a current time, and obtains a recording time corresponding to this recording capacity by conversion using a bit rate of the standard picture quality, and the time display unit displays as output the recording time obtained by conversion by the converting unit. Therefore, this invention has an effect that the user can easily understand a relationship between the recording capacity and the recording time, and this enables the user to easily manage the recording.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A dynamic image encoding apparatus for real-time recording a dynamic image in a storage medium at a variable bit rate of a fixed recording capacity, the dynamic image encoding apparatus comprising:

an obtaining unit for obtaining a recording capacity and a recording time of the recorded information sequentially recorded on said storage medium;

a calculating unit for obtaining a remaining recording capacity and a remaining recording time of said storage medium from the recording capacity and the recording time obtained by said obtaining unit, and for calculating a target bit rate at and after the current time from the remaining recording capacity and the remaining recording time; and a control unit for controlling the variable bit rate during real time recording of the dynamic image sequentially change its quantization step size to a quantization step size for maintaining a level not larger than the target bit rate.

2. The dynamic image encoding apparatus according to claim 1, further comprising:

a first setting unit for setting a lower limit bit rate for guaranteeing a picture quality of not lower than a first predetermined level, wherein said control unit controls at least the variable bit rate to sequentially change its quantization step size to a quantization step size for maintaining a level not smaller than the lower limit bit rate.

3. The dynamic image encoding apparatus according to claim 1, further comprising:

a second setting unit for setting an upper limit bit rate for making a picture quality to be maintained at a level not higher than a second predetermined level, wherein said control unit controls at least the variable bit rate to sequentially change its quantization step size to a quantization step size for maintaining a level not larger than the upper limit bit rate.

4. The dynamic image encoding apparatus according to claim 1, further comprising:

an arithmetic unit for calculating a recording capacity and a recording time for a case where information has been recorded on said storage medium based on a bit rate of a standard picture quality; and a display unit for displaying as output the recording capacity and the recording time calculated by said arithmetic unit.

5. The dynamic image encoding apparatus according to claim 1, further comprising:

a converting unit for obtaining a recording capacity of said storage medium at the current time, and for obtaining a recording time corresponding to this recording capacity by conversion using a bit rate of the standard picture quality; and a time display unit for displaying as output the recording time obtained by conversion by said converting unit.

6. A dynamic image encoding apparatus for real-time recording a dynamic image in a storage medium at a variable bit rate of a fixed recording capacity, the dynamic image encoding apparatus comprising:

a division setting unit for dividing and setting a recording area for the dynamic image of the storage medium into a plurality of divided recording areas;

an obtaining unit for obtaining a recording capacity and a recording time of recorded information sequentially recorded in each of the divided recording areas;

a calculating unit for obtaining a remaining recording capacity and a remaining recording time for each of the divided recording areas from the recording capacity and the recording time obtained by said obtaining unit, and for calculating a target bit rate at and after the current time from the remaining recording capacity and the remaining recording time; and a control unit for controlling the variable bit rate to sequentially change its quantization step size to a quantization step size for maintaining a level not larger than the target bit rate.

7. The dynamic image encoding apparatus according to claim 6, wherein said division setting unit divides the recording area into a plurality of equally divided recording areas.

8. The dynamic image encoding apparatus according to claim 6, further comprising:

a first setting unit for setting a lower limit bit rate for guaranteeing a picture quality of not lower than a first predetermined level, wherein said control unit controls at least the variable bit rate to sequentially change its quantization step size to a quantization step size for maintaining a level-not smaller than the lower limit bit rate.

9. The dynamic image encoding apparatus according to claim 6, further comprising:

a second setting unit for setting an upper limit bit rate for making a picture quality to be maintained at a level not higher than a second predetermined level, wherein said control unit controls at least the variable bit rate to sequentially change its quantization step size to a quantization step size for maintaining a level not larger than the upper limit bit rate.

10. The dynamic image encoding apparatus according to claim 6, further comprising:

an arithmetic unit for calculating a recording capacity and a recording time for a case where information has been recorded on said storage medium based on a bit rate of a standard picture quality; and a display unit for displaying as output the recording capacity and the recording time calculated by said arithmetic unit.

11. The dynamic image encoding apparatus according to claim 6, further comprising:

a converting unit for obtaining a recording capacity of said storage medium at the current time, and for obtaining a recording time corresponding to this recording capacity by conversion using a bit rate of the standard picture quality; and a time display unit for displaying as output the recording time obtained by conversion by said converting unit.

12. A dynamic image encoding apparatus for real-time recording a dynamic image in a storage medium at a variable bit rate of a fixed recording capacity, the dynamic image encoding apparatus comprising:

a setting unit for setting a target bit rate in a predetermined prescribed recording time of recorded information sequentially recorded in said storage medium;

an obtaining unit for obtaining a recording capacity and a recording time of recorded information sequentially recorded on said storage medium;

a calculating unit for calculating an average bit rate at the current time from a recording capacity and a recording time obtained by said obtaining unit after starting the prescribed recording time; and a control unit for controlling the average bit rate to sequentially change its quantization step size to a quantization step size for maintaining a level not larger than the target bit rate for each of the prescribed recording time.

13. The dynamic image encoding apparatus according to claim 12, wherein said setting unit sets the target bit rate as a function of the target bit rate for the prescribed recording time.

14. The dynamic image encoding apparatus according to claim 12, further comprising:

a first setting unit for setting a lower limit bit rate for guaranteeing a picture quality of not lower than a first predetermined level, wherein said control unit controls at least the variable bit rate to sequentially change its quantization step size to a quantization step size for maintaining a level not smaller than the lower limit bit rate.

15. The dynamic image encoding apparatus according to claim 12, further comprising:

a second setting unit for setting an upper limit bit rate for making a picture quality to be maintained at a level not higher than a second predetermined level, wherein said control unit controls at least the variable bit rate to sequentially change its quantization step size to a quantization step size for maintaining a level not larger than the upper limit bit rate.

16. The dynamic image encoding apparatus according to claim 12, further comprising:

an arithmetic unit for calculating a recording capacity and a recording time for a case where information has been recorded on said storage medium based on a bit rate of a standard picture quality; and a display unit for displaying as output the recording capacity and the recording time calculated by said arithmetic unit.

17. The dynamic image encoding apparatus according to claim 12, further comprising:

a converting unit for obtaining a recording capacity of said storage medium at the current time, and for obtaining a recording time corresponding to this recording capacity by conversion using a bit rate of the standard picture quality; and a time display unit for displaying as output the recording time obtained by conversion by said converting unit.

* * * * *